(12) United States Patent
Takayanagi et al.

(10) Patent No.: US 10,149,174 B2
(45) Date of Patent: Dec. 4, 2018

(54) COMMUNICATION SYSTEM

(71) Applicant: MITSUBISHI ELECTRIC CORPORATION, Chiyoda-ku (JP)

(72) Inventors: Fusako Takayanagi, Tokyo (JP); Etsuko Hokan, Tokyo (JP); Taisei Suemitsu, Tokyo (JP); Miho Maeda, Tokyo (JP); Mitsuru Mochizuki, Tokyo (JP); Takayuki Nonami, Tokyo (JP)

(73) Assignee: MITSUBISHI ELECTRIC CORPORATION, Chiyoda-ku (JP)

(*) Notice: Subject to any disclaimer, the term of this patent is extended or adjusted under 35 U.S.C. 154(b) by 0 days.

(21) Appl. No.: 14/903,519

(22) PCT Filed: Jun. 5, 2014

(86) PCT No.: PCT/JP2014/064904
§ 371 (c)(1),
(2) Date: Jan. 7, 2016

(87) PCT Pub. No.: WO2015/008552
PCT Pub. Date: Jan. 22, 2015

(65) Prior Publication Data
US 2016/0165459 A1  Jun. 9, 2016

(30) Foreign Application Priority Data
Jul. 17, 2013 (JP) ................ 2013-148201

(51) Int. Cl.
*H04W 16/32* (2009.01)
*H04W 48/16* (2009.01)
(Continued)

(52) U.S. Cl.
CPC .......... *H04W 16/32* (2013.01); *H04W 48/08* (2013.01); *H04W 48/16* (2013.01); *H04W 48/20* (2013.01)

(58) Field of Classification Search
CPC combination set(s) only.
See application file for complete search history.

(56) References Cited

U.S. PATENT DOCUMENTS 6,944,178 B1 * 9/2005 Charriere .............. H04W 72/10
370/444
7,277,709 B2 10/2007 Vadgama
(Continued)

FOREIGN PATENT DOCUMENTS

| CN | 101243715 A | 8/2008 |
|---|---|---|
| CN | 101507303 A | 8/2009 |

(Continued)

OTHER PUBLICATIONS

Extended European Search Report dated Jan. 16, 2017 in Patent Application No. 14826490.6.
(Continued)

*Primary Examiner* — Steven Kelley
(74) *Attorney, Agent, or Firm* — Oblon, McClelland, Maier & Neustadt, L.L.P.

(57) ABSTRACT

A communication system includes a user equipment (UE), and a plurality of cells that perform communication with the UE. The plurality of cells include a macro cell having a relatively-wide-range coverage, and a plurality of small cells having a relatively-narrow-range coverage. The plurality of small cells are connected to a concentrator. The concentrator selects the small cell to which the UE is to be connected, from among a plurality of small cells, based on the flow of at least either one of the received data that each small cell receives from the UE and the transmission data that each small cell transmits to an MME and an S-GW.

6 Claims, 13 Drawing Sheets

(51) Int. Cl.
*H04W 48/20* (2009.01)
*H04W 48/08* (2009.01)

(56) References Cited

U.S. PATENT DOCUMENTS

| | | | | |
|---|---|---|---|---|
| 8,385,196 | B2* | 2/2013 | Wang | H04L 47/10 370/230 |
| 8,515,353 | B2 | 8/2013 | Hiltunen et al. | |
| 8,750,806 | B2* | 6/2014 | Weil | H04L 12/2697 370/230 |
| 2007/0047480 | A1 | 3/2007 | Suga | |
| 2009/0129341 | A1* | 5/2009 | Balasubramanian | H04W 36/0055 370/331 |
| 2009/0163211 | A1* | 6/2009 | Kitazoe | H04W 74/004 455/436 |
| 2011/0038264 | A1* | 2/2011 | Ishii | H04L 47/10 370/238 |
| 2012/0088539 | A1 | 4/2012 | Jeong et al. | |
| 2012/0129447 | A1* | 5/2012 | Nitta | H04W 4/18 455/9 |
| 2012/0270553 | A1* | 10/2012 | Ha | H04W 36/22 455/438 |
| 2014/0092865 | A1* | 4/2014 | Heo | H04W 4/70 370/331 |
| 2014/0269364 | A1* | 9/2014 | Knapp | H04W 84/18 370/252 |
| 2015/0133121 | A1* | 5/2015 | Li | H04W 24/10 455/436 |
| 2016/0157211 | A1* | 6/2016 | Kato | H04W 16/32 455/450 |

FOREIGN PATENT DOCUMENTS

| | | |
|---|---|---|
| CN | 101953181 A | 1/2011 |
| JP | 2000-295650 A | 10/2000 |
| JP | 2003-134550 A | 5/2003 |
| JP | 2007-67745 A | 3/2007 |
| JP | 2009-111772 A | 5/2009 |
| JP | 2012-504366 A | 2/2012 |
| JP | 2012-85020 A | 4/2012 |
| WO | 2009/116497 A1 | 9/2009 |
| WO | 2010/036188 A1 | 4/2010 |
| WO | WO 2013/079090 A1 | 6/2013 |

OTHER PUBLICATIONS

Ericsson et al: "Detection of Small Cells in HetNets", 3GPP Draft; R2-120467, 3rd Generation Partnership Project (3GPP), Mobile Competence Centre; vol. RAN WG2, XP050565403, Dresden, Germany, Feb. 6-10, 2012, 3 pages.

3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), 3GPP Standard; 3GPP TR 36.842, 3rd Generation Partnership Project (3GPP), Mobile Competence Centre, vol. RAN WG2, No. V0.2.0, XP050692536, Jun. 2, 2013, pp. 1-38.

European Office Action dated Sep. 12, 2017 in Patent Application No. 14 826 490.6.

"3GPP TS 36.300 V11.4.0: 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," Dec. 2012, 207 Pages.

"3GPP TS 36.304 V11.1.0: 3rd Generation Partnership Project; Technical Specification Group Radio Access Network; Evolved Universal Terrestrial Radio Access (E-UTRA); User Equipment (UE) procedures in idle mode (Release 11)," Sep. 2012, 33 Pages.

"LS on HNB/HeNB Open Access Mode," 3GPP SA WG1; S1-083461, Oct. 2008, 2 Pages.

"LS on CSG cell identification," RAN2; 3GPP TSG-RAN WG 2; R2-082899, May 2008, 2 Pages.

"3GPP TR 36.814 V9.0.0: 3rd Generation Partnership Project; Technical Specification Group Radio Access Network; Evolved Universal Terrestrial Radio Access (E-UTRA); Further advancements for E-UTRA physical layer aspects (Release 9)," Mar. 2010, 104 Pages.

"3GPP TR 36.912 V10.0.0: 3rd Generation Partnership Project; Technical Specification Group Radio Access Network; Feasibility study for Further Advancements for E-UTRA (LTE-Advanced) (Release 10)," Mar. 2011, 254 Pages.

"3GPP TR 36.819 V11.1.0: 3rd Generation Partnership Project; Technical Specification Group Radio Access Network; Coordinated multi-point operation for LTE physical layer aspects (Release 11)," Dec. 2011, 69 Pages.

"3GPP TS 36.141 V11.1.0: 3rd Generation Partnership Project; Technical Specification Group Radio Access Network; Evolved Universal Terrestrial Radio Access (E-UTRA); Base Station (BS) conformance testing (Release 11)," Jun. 2012, 224 Pages.

"3GPP TS 36.321 V11.2.0: 3rd Generation Partnership Project; Technical Specification Group Radio Access Network; Evolved Universal Terrestrial Radio Access (E-UTRA); Medium Access Control (MAC) protocol specification (Release 11)," Mar. 2013, 56 Pages.

International Search Report dated Sep. 9, 2014 in PCT/JP14/64904 Filed Jun. 5, 2014.

International Preliminary Report on Patentability and Written Opinion dated Jan. 28, 2016 in PCT/JP2014/064904 filed Jun. 5, 2014 (with English language translation).

Office Action dated Jun. 5, 2018 in Japanese Patent Application No. 2015-527215 (with English language translation).

Chinese Office Action issued in Chinese Patent Application No. 201480040463.9 dated Jul. 4, 2018 (w/ English Translation).

* cited by examiner

F I G . 1
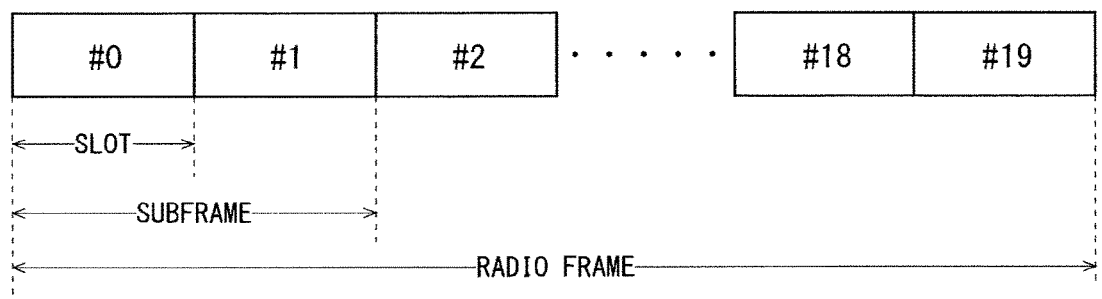

F I G. 6
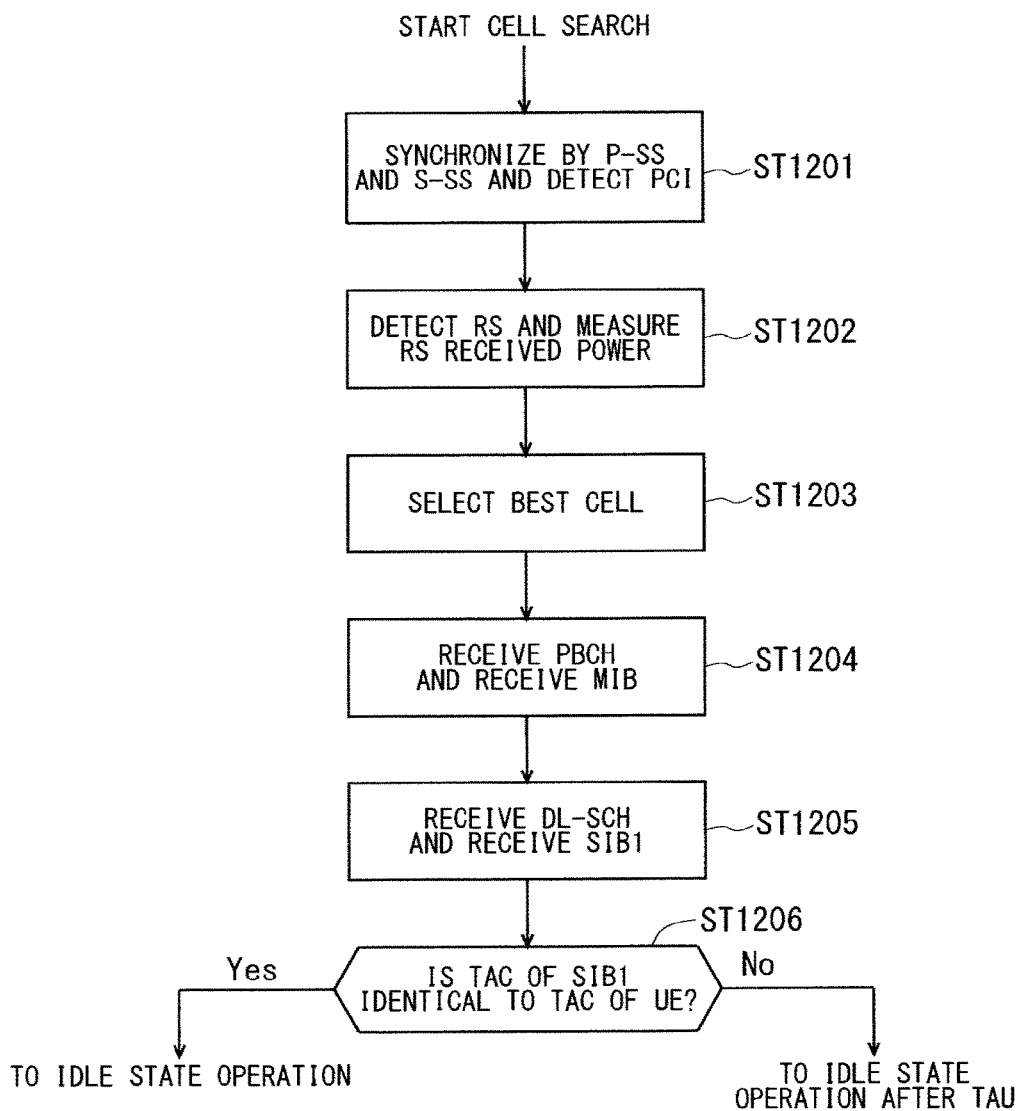

F I G . 7
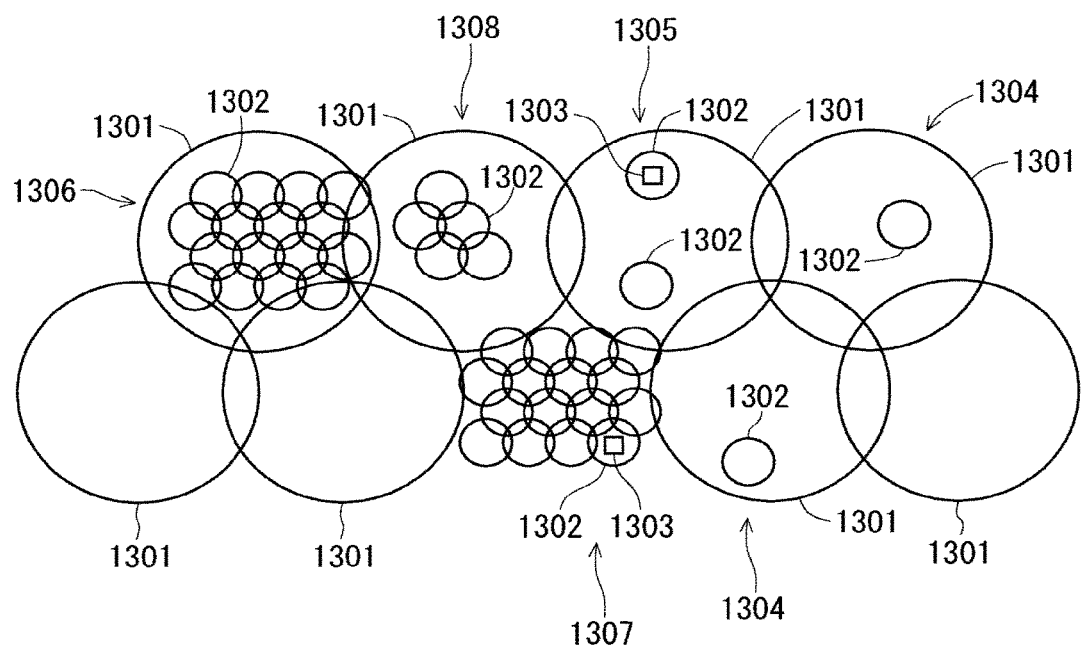

F I G. 9
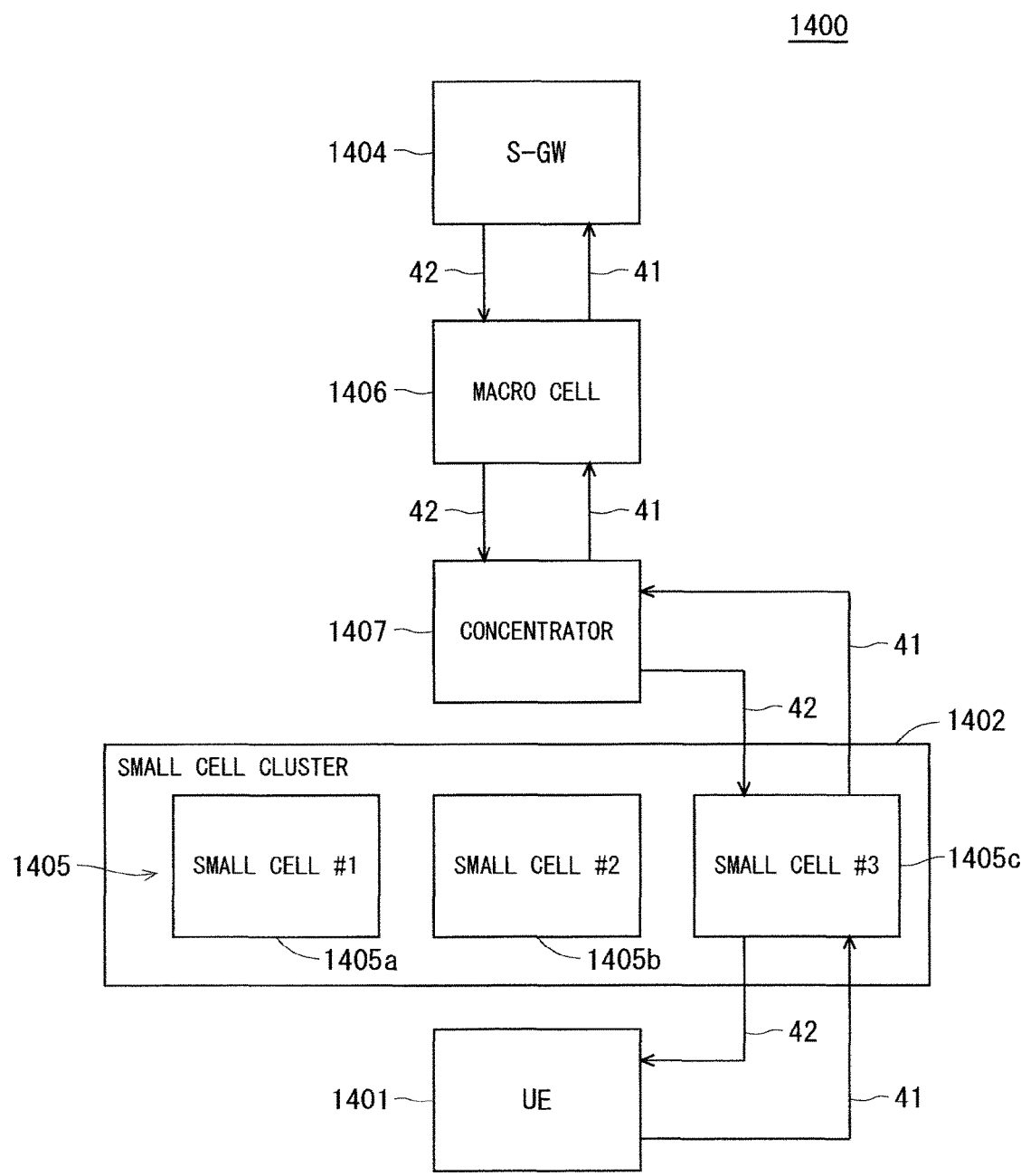

F I G . 1 0
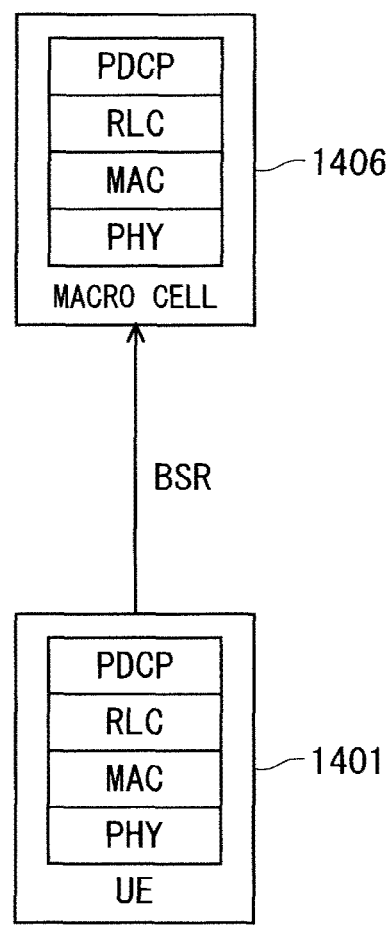

F I G. 1 2
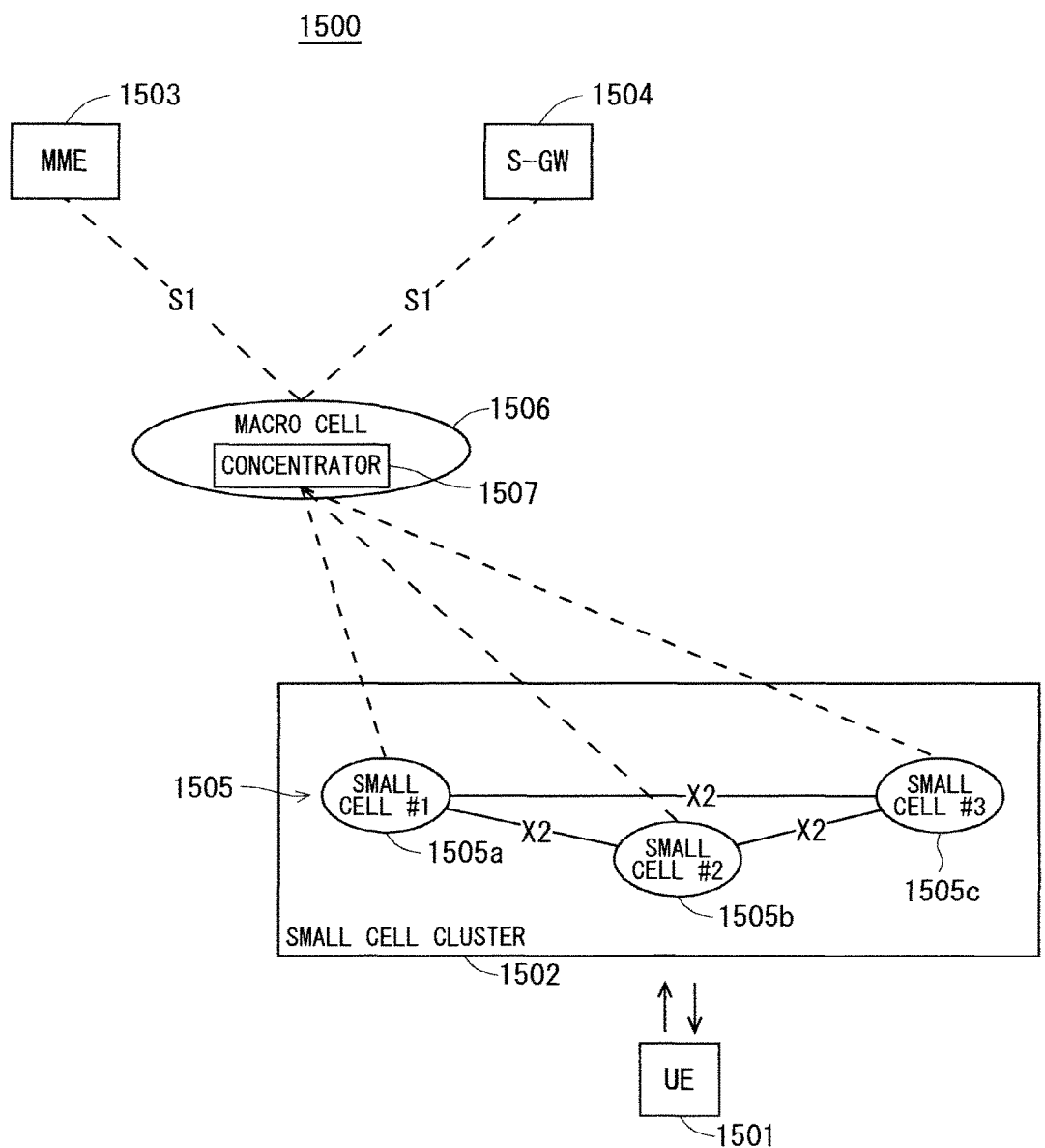

COMMUNICATION SYSTEM

TECHNICAL FIELD

The present invention relates to a communication system that performs radio communication between a communication terminal device and a base station device.

BACKGROUND ART

The 3rd generation partnership project (3GPP) that is a standard organization regarding a mobile communication system is studying new communication systems referred to as long term evolution (LTE) regarding radio sections and system architecture evolution (SAE) regarding the overall system configuration including a core network and a radio access network (hereinafter, collectively referred to as a network as well). This communication system is also referred to as 3.9 generation (3.9 G) system.

As an access scheme of the LTE, orthogonal frequency division multiplexing (OFDM) is used in a downlink direction, and single carrier frequency division multiple access (SC-FDMA) is used in an uplink direction. Further, differently from wideband code division multiple access (W-CDMA) circuit switching is not provided but a packet communication system is only provided in the LTE.

The current decisions by 3GPP regarding the frame configuration in the LTE system described in Non-Patent Document 1 (Chapter 5) will be described with reference to FIG. 1. FIG. 1 is a diagram illustrating the configuration of a radio frame used in the LTE communication system. With reference to FIG. 1, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Non-Patent Document 1 (Chapter 5) describes the current decisions by 3GPP regarding the channel configuration in the LTE system. It is assumed that the same channel configuration is used in a closed subscriber group (CSG) cell as that of a non-CSG cell. The CSG cell will be described below (see Chapter 3.1 of Non-Patent Document 2).

A physical broadcast channel (PBCH) is a channel for downlink transmission from a base station to a mobile terminal. A BCH transport block is mapped to four subframes within a 40 ms interval. There is no explicit signaling indicating 40 ms timing.

A physical control format indicator channel (PCFICH) is a channel for downlink transmission from the base station to the mobile terminal. The PCFICH notifies the number of OFDM (Orthogonal Frequency Division Multiplexing) symbols used for PDCCHs from the base station to the mobile terminal. The PCFICH is transmitted in each subframe.

A physical downlink control channel (PDCCH) is a channel for downlink transmission from the base station to the mobile terminal. The PDCCH notifies the resource allocation information for a downlink shared channel (DL-SCH) being one of the transport channels described later, resource allocation information for a paging channel (PCH) being one of the transport channels described later, and HARQ (Hybrid Automatic Repeat reQuest) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) is a channel for downlink transmission from the base station to the mobile terminal. A downlink shared channel (DL-SCH) that is a transport channel and a PCH that is a transport channel are mapped to the PDSCH.

A physical multicast channel (PMCH) is a channel for downlink transmission from the base station to the mobile terminal. A multicast channel (MCH) that is a transport channel is mapped to the PMCH.

A physical uplink control channel (PUCCH) is a channel for uplink transmission from the mobile terminal to the base station. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) is a channel for uplink transmission from the mobile terminal to the base station. An uplink shared channel (UL-SCH) that is one of the transport channels is mapped to the PUSCH.

A physical hybrid ARQ indicator channel (PHICH) is a channel for downlink transmission from the base station to the mobile terminal. The PHICH carries Ack/Nack that is a response signal to uplink transmission. A physical random access channel (PRACH) is a channel for uplink transmission from the mobile terminal to the base station. The PRACH carries a random access preamble.

A downlink reference signal (RS) is a known symbol in the LTE communication system. The following five types of downlink reference signals are defined: cell-specific reference signals (CRS), MBSFN reference signals, data demodulation reference signal (DM-RS) being UE-specific reference signals, positioning reference signals (PRS), and channel-state information reference signals (CSI-RS). The physical layer measurement objects of a mobile terminal include reference signal received power (RSRP).

The transport channels described in Non-Patent Document 1 (Chapter 5) will be described. A broadcast channel (BCH) among the downlink transport channels shown in FIG. 5(A) is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH can be broadcasted to the entire coverage of the base station (cell). The DL-SCH supports dynamic or semi-static resource allocation. The semi-static resource allocation is also referred to as persistent scheduling. The DL-SCH supports discontinuous reception (DRX) of a mobile terminal for enabling the mobile terminal to save power. The DL-SCH is mapped to the physical downlink shared channel (PDSCH).

The paging channel (PCH) supports DRX of the mobile terminal for enabling the mobile terminal to save power. The PCH is required to be broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of MBMS services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels. The UL-SCH supports dynamic or semi-static resource allocation. The UL-SCH is mapped to the physical uplink shared channel (PUSCH).

A random access channel (RACH) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. If the receiver fails to successfully decode the received data, in other words, if a cyclic redundancy check (CRC) error occurs (CRC=NG), the receiver transmits "Nack" to the transmitter. The transmitter that has received "Nack" retransmits the data. If the receiver successfully decodes the received data, in other words, if a CRC error does not occur (CRC=OK), the receiver transmits "AcK" to the transmitter. The transmitter that has received "Ack" transmits the next data.

The logical channels described in Non-Patent Document 1 (Chapter 6) will be described. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging information and system information change notifications. The PCCH is used when the network does not know the cell location of a mobile terminal. The PCCH that is a logical channel is mapped to the paging channel (PCH) that is a transport channel.

A common control channel (CCCH) is a channel for transmission control information between mobile terminals and a base station. The CCCH is used in the case where the mobile terminals have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a mobile terminal. The MCCH is used only by a mobile terminal during reception of the MBMS. The MCCH is mapped to the multicast channel (MCH) that is a transport channel.

A dedicated control channel (DCCH) is a channel that transmits dedicated control information between a mobile terminal and a network on a point-to-point basis. The DCCH is used if the mobile terminal has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated mobile terminal. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a mobile terminal. The MTCH is a channel used only by a mobile terminal during reception of the MBMS. The MTCH is mapped to the multicast channel (MCH).

A CGI represents a cell global identifier. An ECGI represents an E-UTRAN cell global identifier. A closed subscriber group (CSG) cell is introduced in the LTE, and the long term evolution advanced (LTE-A) and universal mobile telecommunication system (UMTS) described below.

The closed subscriber group (CSG) cell is a cell in which subscribers who are allowed to use are specified by an operator (hereinafter, also referred to as a "cell for specific subscribers"). The specified subscribers are allowed to access one or more cells of a public land mobile network (PLMN). One or more cells in which the specified subscribers are allowed access are referred to as "CSG cell(s)." Note that access is limited in the PLMN.

The CSG cell is part of the PLMN that broadcasts a specific CSG identity (CSG ID; CSG-ID) and broadcasts "TRUE" in a CSG indication. The authorized members of the subscriber group who have registered in advance access the CSG cells using the CSG-ID that is the access permission information.

The CSG-ID is broadcast by the CSG cell or cells. A plurality of CSG-IDs exist in the LTE communication system. The CSG-IDs are used by mobile terminals (UEs) for making access from CSG-related members easier.

The locations of mobile terminals are tracked on the basis of an area composed of one or more cells. The locations are tracked for enabling tracking the locations of mobile terminals and calling mobile terminals, in other words, incoming calling to mobile terminals even in an idle state. An area for tracking locations of mobile terminals is referred to as a tracking area.

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 3 discloses three different modes of the access to the HeNB and HNB. Specifically, an open access mode, a closed access mode, and a hybrid access mode are disclosed.

The respective modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is the cell that supports both the open access mode and the closed access mode.

In 3GPP, among all physical cell identifiers (PCI), there is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to mobile terminals being served thereby. To be served by a base station means to take the base station as a serving cell.

Non-Patent Document 4 discloses the basic operation of a mobile terminal using PCI split. The mobile terminal that does not have the PCI split information needs to perform cell search using all PCIs, for example, using all 504 codes. On the other hand, the mobile terminal that has the PCI split information is capable of performing cell search using the PCI split information.

Further, 3GPP is pursuing specifications standard of long term evolution advanced (LTE-A) as Release 10 (see Non-Patent Documents 5 and 6). The LTE-A is based on the LTE communication system regarding radio sections and is configured by addition of several new techniques thereto.

Carrier aggregation (CA) is studied in the LTE-A system, in which two or more component carriers (CCs) are aggregated to support wider transmission bandwidths up to 100 MHz.

In the case where a CA is configured, a UE has a single RRC connection with a network (NW). In RRC connection, one serving cell provides NAS mobility information and security input. This cell is referred to as a primary cell (PCell). In downlink, a carrier corresponding to a PCell is a downlink primary component carrier (DL PCC). In uplink, a carrier corresponding to PCell is an uplink primary component carrier (UL PCC).

A secondary cell (SCell) is configured to form a serving cell group with a PCell, in accordance with the UE capability. In downlink, a carrier corresponding to SCell is a downlink secondary component carrier (DL SCC). In uplink, a carrier corresponding to SCell is an uplink secondary component carrier (UL SCC).

A serving cell group of one PCell and one or more SCells is configured for one UE.

Further, new techniques in the LTE-A include the technique of supporting wider bands (wider bandwidth extension) and the coordinated multiple point transmission and reception (CoMP) technique. The CoMP studied for LTE-A in 3GPP is described in Non-Patent Document 7.

Further, 3GPP is pursuing specifications standard of Release 12. Among the specifications, in order to satisfy a tremendous volume of traffic in the future, the use of small eNBs configuring a small cell is studied. Examples of the study include the technique of increasing spectral efficiency by configuring a large number of small cells by installing a large number of small eNBs to increase communication capacity.

A traffic amount of a mobile network is in an increasing tendency, and increasing a communication speed is also progressed. When the application of the LTE and the LTE-A is started on a full scale, the communication speed is further increased, and an increase of the traffic amount is expected.

A conventional mobile communication system has a problem that the probability of occurrence of a delay in the network and loss of data may further increase (hereinafter, also referred to as an "occurrence probability") as a traffic amount increases. A technique to solve such a problem is disclosed in Patent Document 1, for example.

Patent Document 1 discloses a user device having means for selecting a data transmission cell based on a measurement value of a congestion level in a cell.

PRIOR ART DOCUMENTS

Patent Documents

Patent Document 1: Japanese Patent Application Laid-Open No. 2003-134550

Non-Patent Documents

Non-Patent Document 1: 3GPP TS 36.300 V11.4.0
Non-Patent Document 2: 3GPP TS 36.304 V11.1.0 Chapter 3.1
Non-Patent Document 3: 3GPP S1-083461
Non-Patent Document 4: 3GPP R2-082899
Non-Patent Document 5: 3GPP TR 36.814 V9.0.0
Non-Patent Document 6: 3GPP TR 36.912 V10.0.0
Non-Patent Document 7: 3GPP TR 36.819 V11.1.0

SUMMARY OF INVENTION

Problems to be Solved by the Invention

According to the technique disclosed in Patent Document 1, a user device selects a cell. In the case where a plurality of user devices exist in the communication system, the user devices select cells individually. In this case, there is a risk that a cell having a relatively low congestion level at a time point of measuring the congestion level is selected by a plurality of user devices so that load of the cell increases. Thus, with the technique disclosed in Patent Document 1, it is not possible to reduce the occurrence probability of a delay in the network and the loss of data.

Further, according to the technique disclosed in Patent Document 1, the user device selects a cell having a low congestion level in downlink. Patent Document 1 fails to expressly disclose uplink. With the technique disclosed in Patent Document 1, it is not possible to select a cell in consideration of congestion in uplink.

An object of the present invention is to provide a communication system capable of reducing the occurrence probability of a delay in the network and loss of data.

Means for Solving the Problems

A communication system according to the present invention includes a communication terminal device, and one or a plurality of base station devices that perform radio communication with the communication terminal device. The communication system includes a plurality of cells that are configured by the one or the plurality of base station devices, and perform radio communication with the communication terminal device by being connected to the communication terminal device, and a higher-level device that is provided in a higher level of the base station device. A cell to which the communication terminal device is to be connected is selected from among the plurality of cells, based on a flow of at least either one of received data that each cell has received from the communication terminal device and transmission data that each cell has transmitted to the higher-level device.

Effects of the Invention

According to the communication system of the present invention, a cell to which the communication terminal device is to be connected is selected from among the plurality of cells, based on a flow of at least either one of received data that each cell has received from the communication terminal device and transmission data that each cell has transmitted to the higher-level device. Accordingly, in the case where a traffic volume in the communication system has increased, load can be dispersed to each cell. Therefore, because concentration of traffic in a specific cell can be prevented, it is possible to reduce the occurrence probability of a delay in the entire network including a core network and loss of data.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of a radio frame used in an LTE communication system.

FIG. 6 is a flowchart showing an outline from a cell search to an idle state operation performed by a user equipment (UE) in the LTE communication system.

FIG. 7 is a diagram showing the concept of the configuration of cells in which macro eNBs and small eNBs coexist.

FIG. 9 is a diagram showing a flow direction of data in the communication system 1400 according to the first embodiment of the present invention.

FIG. 10 is a diagram showing a configuration of a protocol stack in a communication system 1410 according to a conventional technique.

FIG. 12 is a block diagram showing the configuration of a communication system 1500 according to a second embodiment of the present invention.

DESCRIPTION OF EMBODIMENTS

First Embodiment

Figure 2:
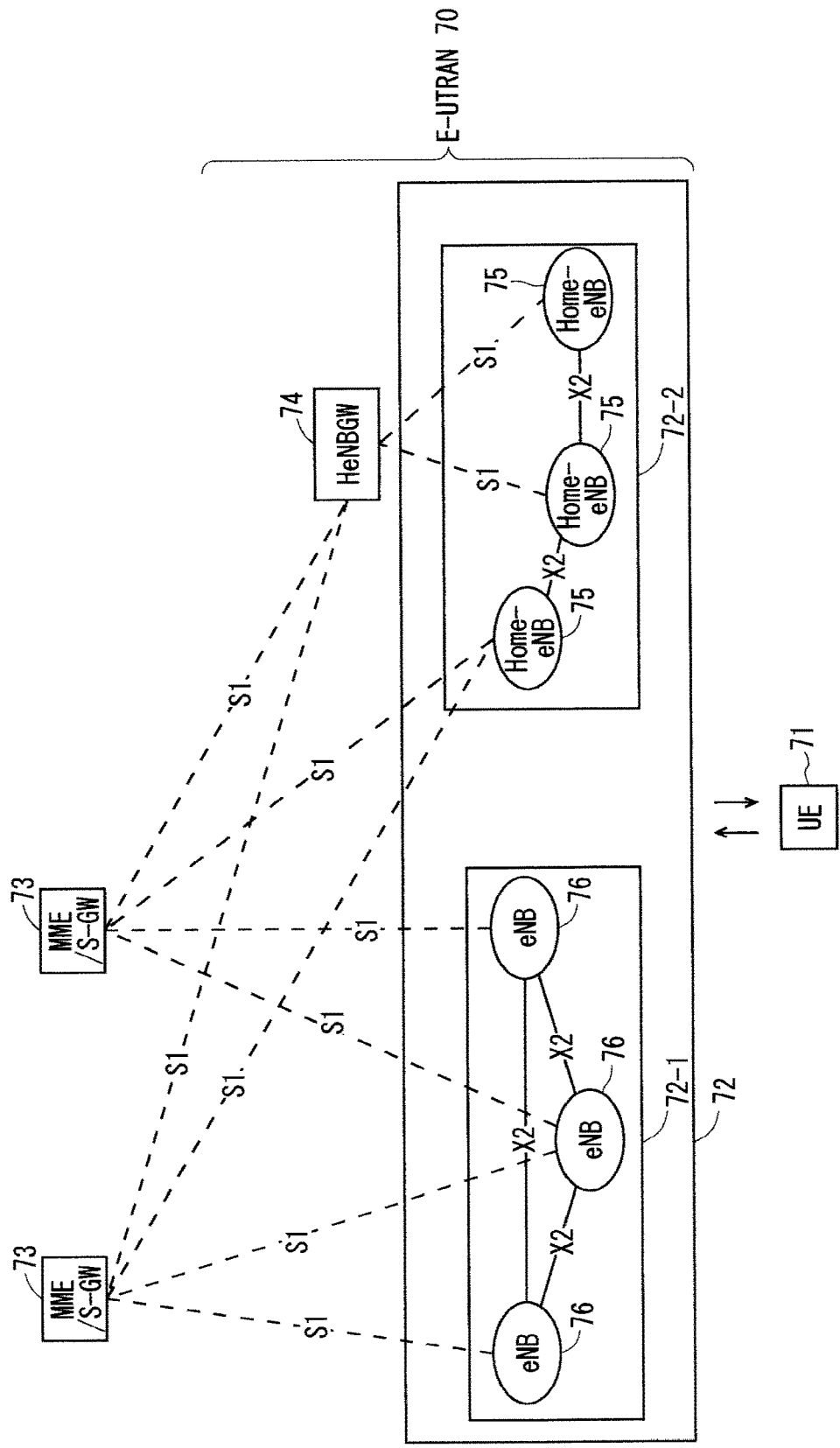
FIG. 2 is a block diagram showing the overall configuration of an LTE communication system 700 currently under discussion of 3GPP.

FIG. 2 is a block diagram showing an overall configuration of an LTE communication system 700, which is currently under discussion of 3GPP. FIG. 2 will be described. A radio access network will be referred to as an evolved universal terrestrial radio access network (E-UTRAN) 70. A mobile terminal device (hereinafter, referred to as a "mobile terminal (user equipment (UE))" 71 being a communication terminal device is capable of performing radio communication with a base station device (hereinafter, referred to as a "base station (E-UTRAN NodeB: eNB)" 72, and transmits and receives signals through radio communication.

A control protocol RRC between the user equipment 71 and the base station 72 performs broadcast, paging, RRC connection management, and the like. The states of the base station 72 and the user equipment 71 in RRC are classified into RRC_IDLE and RRC_CONNECTED.

In RRC_IDLE, public land mobile network (PLMN) selection, system information (SI) broadcast, paging, cell re-selection, mobility, and the like are performed. In RRC_CONNECTED, the user equipment has RRC connection and is capable of transmitting/receiving data to/from a network. In RRC_CONNECTED, for example, handover (HO) and measurement of a neighbor cell are performed.

The base stations 72 are classified into eNBs 76 and Home-eNBs 75. The communication system 700 includes an eNB group 72-1 including a plurality of eNBs 76, and a Home-eNB group 72-2 including a plurality of Home-eNBs 75. A system configured by an EPC (Evolved Packet Core) being a core network and an E-UTRAN 70 being a radio access network will be referred to as an EPS (Evolved Packet System). The EPC being a core network and the E-UTRAN 70 being the radio access network are also collectively referred to as a "network".

The eNB 76 is connected to an MME/S-GW unit (hereinafter, also referred to as an "MME unit") 73 including an MME, or an S-GW, or an MME and an S-GW by means of an S1 interface, and control information is communicated between the eNB 76 and the MME unit 73. A plurality of MME units 73 may be connected to one eNB 76. The eNBs 76 are connected to each other by means of an X2 interface, and control information is communicated between the eNBs 76.

The Home-eNB 75 is connected to the MME unit 73 by means of an S1 interface, and control information is communicated between the Home-eNB 75 and the MME unit 73. A plurality of Home-eNBs 75 are connected to one MME unit 73. Alternatively, the Home-eNBs 75 are connected to the MME units 73 through a HeNBGW (Home-eNB Gate-Way) 74. The Home-eNB 75 is connected to the HeNBGW 74 by an S1 interface, and the HeNBGW 74 is connected to the MME unit 73 by means of an S1 interface.

One or a plurality of Home-eNBs 75 are connected to one HeNBGW 74, and information is communicated therebetween by means of an S1 interface. The HeNBGW 74 is connected to one or a plurality of MME units 73, and information is communicated therebetween by means of an S1 interface.

The MME units 73 and HeNBGW 74 are higher-level devices, specifically, higher nodes, and control connections between the eNB 76 and the Home-eNB 75 being base stations, and the user equipment (UE) 71. The MME unit 73 configures an EPC being a core network. The base station 72 and the HeNBGW 74 configure the E-UTRAN 70.

Further, 3GPP has studied the configuration below. The X2 interface between the Home-eNBs 75 is supported. In other words, the Home-eNBs 75 are connected to each other by means of an X2 interface, and control information is communicated between the Home-eNBs 75. The HeNBGW 74 appears to the MME unit 73 as the Home-eNB 75. The HeNBGW 74 appears to the Home-eNB 75 as the MME unit 73.

The interfaces between the Home-eNBs 75 and the MME units 73 are the same, which are the S1 interfaces, in the both cases where the Home-eNB 75 is connected to the MME unit 73 through the HeNBGW 74 and the Home-eNB 75 is directly connected to the MME unit 73.

The base station device 72 may configure a single cell, or may configure a plurality of cells. Each cell has a range predetermined as a coverage in which the cell can communicate with a communication terminal device, and the cell performs radio communication with the communication terminal device within the coverage. In the case where one base station device configures a plurality of cells, every cell is configured to communicate with a mobile terminal.

Figure 3:
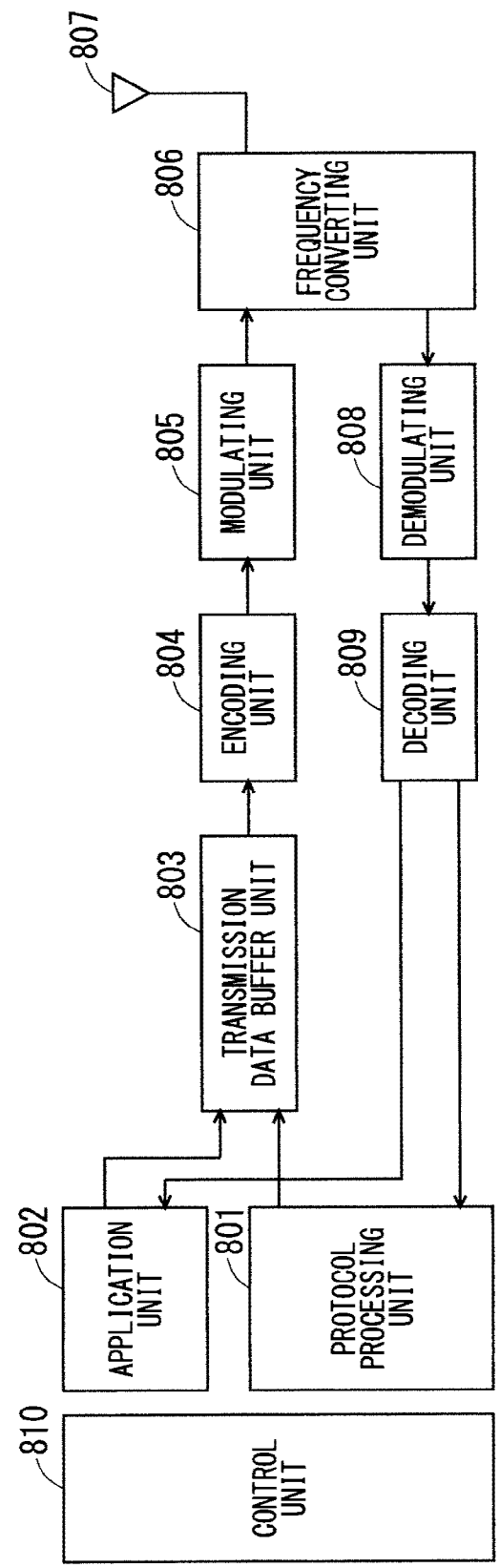
FIG. 3 is a block diagram showing the configuration of a user equipment 71 of FIG. 2 being a user equipment according to the present invention.

FIG. 3 is the block diagram showing the configuration of the user equipment 71 of FIG. 2 being a user equipment according to the present invention. The transmission process of the user equipment 71 illustrated in FIG. 3 will be described. First, a transmission data buffer unit 803 stores the control data from a protocol processing unit 801 and the user data from an application unit 802. The data stored in the transmission data buffer unit 803 is passed to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is converted into a baseband signal, and the baseband signal is output to a frequency converting unit 806 and is then converted into a radio transmission frequency. After that, a transmission signal is transmitted from an antenna 807 to the base station 72.

The user equipment 71 executes the reception process as follows. The radio signal from the base station 72 is received through the antenna 807. The received signal is converted from a radio reception frequency into a baseband signal by the frequency converting unit 806 and is then demodulated by a demodulating unit 808. The demodulated data is passed to a decoding unit 809 and is subjected to a decoding process such as error correction. Among the pieces of decoded data, the control data is passed to the protocol processing unit 801, while the user data is passed to the application unit 802. A series of processes of the user equipment 71 is controlled by a control unit 810. This means that, though not illustrated in FIG. 3, the control unit 810 is connected to the respective units 801 to 809.

Figure 4:
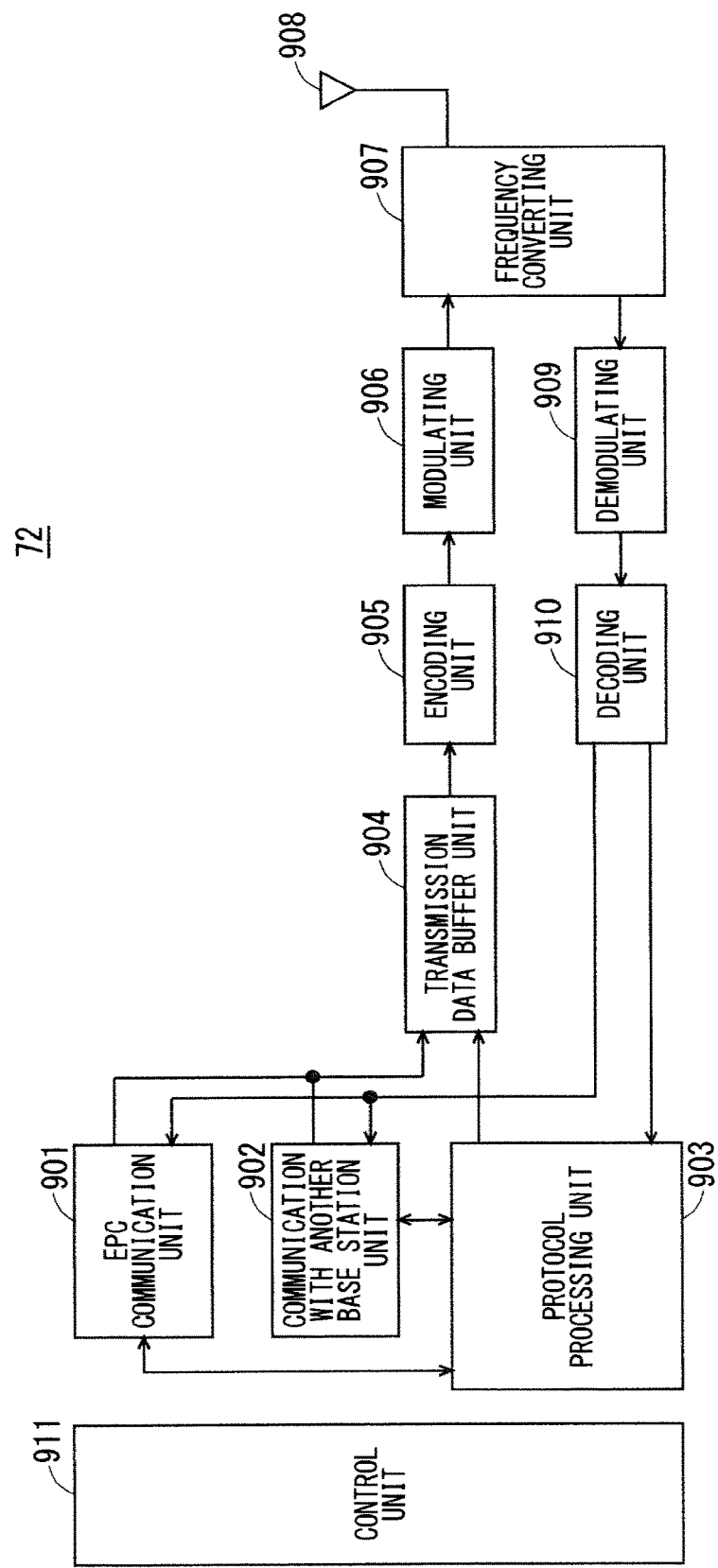
FIG. 4 is a block diagram showing the configuration of a base station 72 of FIG. 2 being a base station according to the present invention.

FIG. 4 is a block diagram showing the configuration of the base station 72 of FIG. 2 being a base station according to the present invention. The transmission process of the base station 72 illustrated in FIG. 4 will be described. An EPC communication unit 901 performs data transmission and reception between the base station 72 and the EPC (such as the MME unit 73) and the HeNBGW 74. A communication with another base station unit 902 performs data transmission and reception to and from another base station. The EPC communication unit 901 and the communication with another base station unit 902 each transmit and receive information to and from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is passed to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is converted into a baseband signal, and the baseband signal is output to a frequency converting unit 907 and is then converted into a radio transmission frequency. After that, a transmission signal is transmitted from an antenna 908 to one or a plurality of user equipments 71.

The reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is passed to a decoding unit 910 and is then subjected to a decoding process such as error correction. Among the pieces of decoded data, the control data is passed to the protocol processing unit 903, the EPC communication unit 901, or the communication with another base station unit 902, while the user data is passed to the EPC communication unit 901 and the communication with another base station unit 902. A series of processes by the base station 72 is controlled by a control unit 911. This means that, though not illustrated in FIG. 4, the control unit 911 is connected to the respective units 901 to 910.

Figure 5:
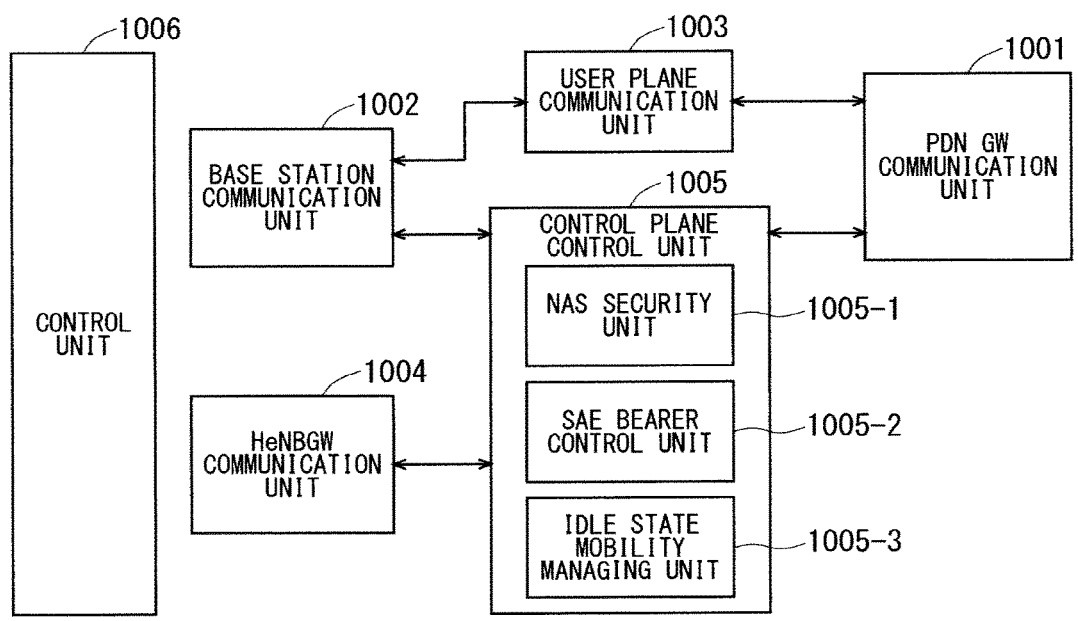
FIG. 5 is a block diagram showing the configuration of an MME according to the present invention.

FIG. 5 is a block diagram showing the configuration of the MME according to the present invention. FIG. 5 illustrates the configuration of an MME 73*a* included in the MME unit 73 illustrated in FIG. 2 described above. A PDN GW communication unit 1001 performs data transmission and reception between the MME 73*a* and a PDN GW. A base station communication unit 1002 performs data transmission and reception between the MME 73*a* and the base station 72 by means of the S1 interface. If the data received from the PDN GW is user data, the user data is passed from the PDN GW communication unit 1001 to the base station communication unit 1002 via a user plane communication unit 1003 and is then transmitted to one or a plurality of base stations 72. If the data received from the base station 72 is user data, the user data is passed from the base station communication unit 1002 to the PDN GW communication unit 1001 via the user plane communication unit 1003 and is then transmitted to the PDN GW.

If the data received from the PDN GW is control data, the control data is passed from the PDN GW communication unit 1001 to a control plane control unit 1005. If the data received from the base station 72 is control data, the control data is passed from the base station communication unit 1002 to the control plane control unit 1005.

A HeNBGW communication unit 1004 is provided in the case where the HeNBGW 74 is provided, which performs data transmission and reception between the MME 73*a* and the HeNBGW 74 by means of the interface (IF) according to an information type. The control data received from the HeNBGW communication unit 1004 is passed from the HeNBGW communication unit 1004 to the control plane control unit 1005. The processing results of the control plane control unit 1005 are transmitted to the PDN GW via the PDN GW communication unit 1001. The processing results of the control plane control unit 1005 are transmitted to one or a plurality of base stations 72 by means of the S1 interface via the base station communication unit 1002, and are transmitted to one or a plurality of HeNBGWs 74 via the HeNBGW communication unit 1004.

The control plane control unit 1005 includes a NAS security unit 1005-1, an SAE bearer control unit 1005-2, an idle state mobility managing unit 1005-3, or other unit, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of a paging signal in the idle state, addition, deletion, update, and search of a tracking area of one or a plurality of user equipments 71 being served thereby, and tracking area list management.

The MME 73*a* distributes a paging signal to one or a plurality of base stations 72. In addition, the MME 73*a* performs mobility control of an idle state. When the user equipment is in the idle state and an active state, the MME 73*a* manages a list of tracking areas. The MME 73*a* begins a paging protocol by transmitting a paging message to the cell belonging to a tracking area in which the UE is registered. The idle state mobility managing unit 1005-3 may manage the CSG of the Home-eNBs 75 to be connected to the MME 73a, the CSG-IDs, and a whitelist.

An example of a cell search method in a mobile communication system will be described next. FIG. 6 is the flowchart showing an outline from a cell search to an idle state operation performed by a user equipment (UE) in the LTE communication system. When starting a cell search, in Step ST1201, the user equipment synchronizes slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which individually correspond to physical cell identities (PCIs) assigned per cell, are assigned to the synchronization signal (SS). The number of PCIs is currently studied in 504 ways. The 504 ways of PCIs are used for synchronization, and the PCIs of the synchronized cells are detected (specified).

In Step ST1202, next, with respect to the synchronized cells, the user equipment detects a cell-specific reference signal (CRS) being a reference signal (RS) transmitted from the base station per cell and measures the reference signal received power (RSRP). The codes individually corresponding to the PCIs are used for the reference signal RS. Separation from another cell is enabled by correlation using the code. The code for RS of the cell is derived from the PCI specified in Step ST1201, which makes it possible to detect the RS and measure the RS received power.

In Step ST1203, next, the user equipment selects the cell having the best RS reception quality, for example, the cell having the highest RS received power, that is, the best cell, from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), the number of transmission antennas, and system frame number (SFN).

In Step ST1205, next, the user equipment receives the DL-SCH of the cell on the basis of the cell configuration information of the MIB, to thereby obtain a system information block (SIB) 1 of the broadcast information BCCH. The SIB1 contains information about the access to the cell, information about cell selection, and scheduling information on other SIB (SIBk; k is an integer equal to or larger than two). In addition, the SIB1 contains a tracking area code (TAC).

In Step ST 1206, next, the user equipment compares the TAC of the SIB1 received in Step ST 1205 with the TAC portion of a tracking area identifier (TAI) in the tracking area list that has already been possessed by the user equipment. The tracking area list is also referred to as a TAI list. The TAI is identification information for identifying a tracking area, and is composed of an MCC (Mobile Country Code), an MNC (Mobile Network Code), and a TAC (Tracking Area Code). MCC is a country code. MNC is a network code. TAC is the code number of a tracking area.

If the TAC received in Step ST1205 is identical to the TAC included in the tracking area list as a result of the comparison of Step ST1206, the user equipment enters an idle state operation in the cell. If the TAC received in Step ST1205 is not included in the tracking area list as a result of the comparison, the user equipment requires a core network (EPC) including MME and the like to change a tracking area through the cell for performing tracking area update (TAU).

A device that configures a core network (hereinafter, also referred to as a "core network side device") updates the tracking area list on the basis of an identification number (such as a UE-ID) of the user equipment transmitted from the user equipment together with a TAU request signal. The core network side device transmits the updated tracking area list to the user equipment. The user equipment rewrites (updates) the TAC list of the user equipment on the basis of the received tracking area list. After that, the user equipment enters the idle state operation in the cell.

Widespread use of smartphones and tablet terminals explosively increases traffic in cellular radio communications, causing a fear of insufficient radio resources all over the world. To increase spectral efficiency, accordingly, it is studied to downsize cells for further spatial separation.

In the configuration of a conventional cell, a cell configured by an eNB has a relatively-wide-range coverage. Conventionally, a cell is configured such that relatively-wide-range coverages of a plurality of cells configured by a plurality of eNBs cover a certain area.

In the case of the downsized cells, the cell configured by an eNB has a narrow-range coverage as compared with the coverage of a cell configured by a conventional eNB. Therefore, in order to cover a certain area as in the conventional case, a larger number of downsized eNBs than the conventional eNBs are necessary.

In the following description, like the cell configured by a conventional eNB, a cell configuring a relatively-wide-range coverage, that is, a cell having a relatively wide coverage area, will be referred to as a "macro cell", and an eNB that configures the macro cell will be referred to as a "macro eNB". Further, like a downsized cell that configures a relatively-narrow-range coverage, that is, a cell having a relatively narrow coverage area will be referred to as a "small cell", and an eNB configuring the small cell will be referred to as a "small eNB".

The macro eNB may be, for example, a "wide area base station" described in 3GPP TS 36.141 V11.1.0 (hereinafter, referred to as "Non-Patent Document 8").

The small eNB may be, for example, a low power node, local area node, or hotspot. Alternatively, the small eNB may be a pico eNB configuring a pico cell, a femto eNB constituting a femto cell, HeNB, RRH, RRU, RRE, or RN. Still alternatively, a small eNB may be a "local area base station", or a "home base station" as described in Non-Patent Document 8.

FIG. 7 is a diagram showing the concept of the configuration of cells in which macro eNBs and small eNBs coexist. A macro cell configured by a macro eNB has a relatively-wide-range coverage 1301. A small cell configured by small eNBs has a narrow range coverage 1302 as compared with the coverage 1301 of a macro cell configured by macro eNBs.

In the case where a plurality of eNBs coexist, a coverage of a cell configured by a certain eNB may be included in the coverage of a cell configured by other eNB. In the configuration of a cell illustrated in FIG. 7, as indicated by a reference "1304" or "1305", the coverage 1302 of a small cell configured by small eNBs may be included in the coverage 1301 of a macro cell configured by macro eNBs.

As indicated by a reference "1305", the coverages 1302 of a plurality of, for example, "two", small cells may be included in the coverage 1301 of one macro cell. The user equipment (UE) 1303 is included in the coverage 1302 of a small cell, for example, and performs communication through the small cell.

In the configuration of a cell illustrated in FIG. 7, as indicated by a reference "1306", the coverage 1301 of a macro cell configured by macro eNBs and the coverage 1302 of a small cell configured by small eNBs may overlap each other in a complicated manner.

Further, as indicated by a reference "1307", there also occurs a case where the coverage 1301 of a macro cell configured by macro eNBs and the coverage 1302 of a small cell configured by small eNBs may not overlap each other.

Further, as indicated by a reference "1308", the coverage 1302 of a large number of small cells configured by a large number of small eNBs may be configured in the coverage 1301 of one macro cell configured by one macro eNB.

The problems solved and a solution in the first embodiment will be described below. In the present embodiment, considered here is a configuration that a coverage of small cells configured by small eNBs is included in the coverage of a macro cell configured by macro eNBs.

As described above, in order to satisfy an enormous traffic in the future, examples of the study include the technique of increasing spectral efficiency through installation of a large number of small cells by installing a large number of small eNBs to increase a communication capacity.

In the case where a large number of small cells are installed, it becomes a problem about to which small cell the UE is to be connected.

For example, considered here is a case where a small cell in which received power in the UE becomes maximum is selected like the conventional technique. In this case, when the load of the selected small cell is already excessively large, radio resources given to the UE connected to the small cell are reduced, and high throughput cannot be obtained. Therefore, there occurs a problem such as the occurrence of a high delay in the data transmission.

In the present embodiment, in order to solve such a problem, in selecting a small cell to be connected to the UE, information about a flow of data (hereinafter, also referred to as a "data flow") is used. Thus, it is an object to improve a delay in the entire network by dispersing the process load of a small cell.

Figure 8:
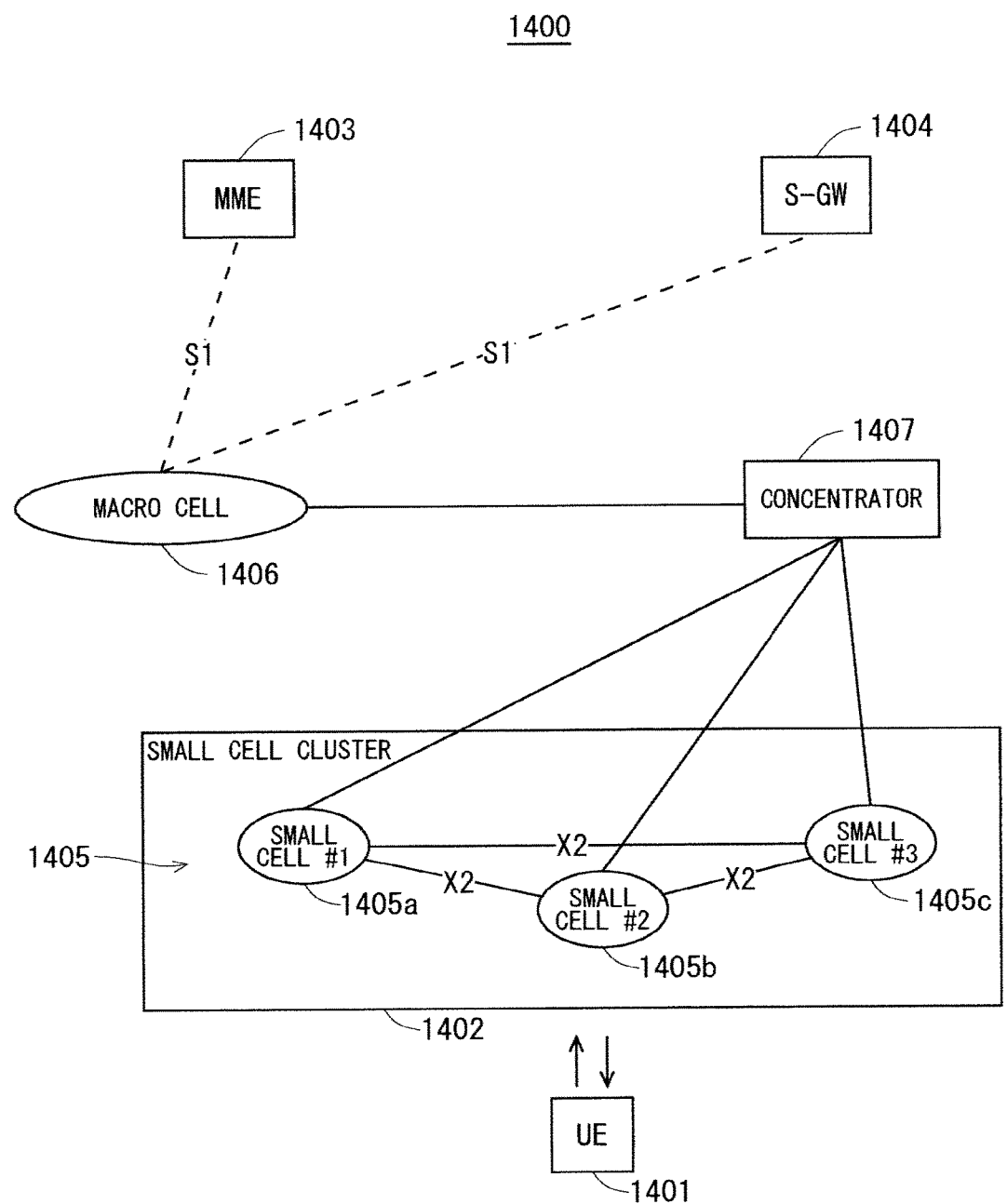
FIG. 8 is a block diagram showing the configuration of a communication system 1400 according to a first embodiment of the present invention.

FIG. 8 is a block diagram showing the configuration of the communication system 1400 according to the first embodiment of the present invention. The communication system 1400 is configured to include a UE 1401, a small cell cluster 1402, an MME 1403, an S-GW 1404, a macro cell 1406, and a concentrator 1407. The small cell cluster 1402 includes one or a plurality of small cells 1405.

The MME 1403 and the S-GW 1404 correspond to higher-level devices. In this case, the higher-level device refers to a device provided in a higher level of the base station device. That is, the higher-level device is provided on a core network side based on the base station device. As the higher-level devices, there are a higher-level entity and a higher-level node.

The base station device is a macro eNB and a small eNB, for example, and configures a cell like a macro cell and a small cell. In the case where a plurality of cells are installed, the plurality of cells may be configured by one base station device, or may be configured by a plurality of base station devices.

FIG. 8 illustrates a case where the small cell cluster 1402 includes three small cells 1405. In the following description, in the case of distinctly indicating three small cells 1405, by adding suffixes "a", "b", and "c" to the reference "1405", the small cells 1405 will be respectively indicated as a first small cell #1 1405a, a second small cell #2 1405b, and a third small cell #3 1405c. In the case of indicating three small cells 1405 without distinction, the small cell will be indicated by adding a reference "1405".

The small cell 1405 is configured by a small eNB. The eNB that configures the small cell 1405 corresponds to Home-eNB 75 illustrated in FIG. 2 described above, for example. The macro cell 1406 is configured by a macro eNB. The macro eNB that configures the macro cell 1406 corresponds to an eNB 76 illustrated in FIG. 2 described above, for example.

The communication system 1400 according to the present embodiment is configured to include the concentrator 1407 between the macro cell 1406 and the small cell 1405, unlike the architecture of the communication system of the conventional technique. The concentrator 1407 is an entity that collectively controls the small cells 1405 in the small cell cluster 1402 consisting of one or a plurality of small cells 1405.

The macro cell 1406 and the concentrator 1407 are connected to each other by means of a new interface. The small cell 1405 and the concentrator 1407 are connected to each other by means of a new interface. A plurality of small cells 1405 are connected to one concentrator 1407. In the example illustrated in FIG. 8, three small cells 1405 are connected to one concentrator 1407. The small cells 1405 are connected to each other by means of an interface. In the case where each small cell is configured by one small eNB, an x2 interface is used as an interface between the small cells 1405.

FIG. 9 is a diagram showing the flow direction of data in the communication system 1400 according to the first embodiment of the present invention. In FIG. 9, an uplink (UL) traffic is indicated by an arrow of a reference "41", and a downlink (DL) traffic is indicated by an arrow of a reference "42".

The concentrator 1407 has the function of obtaining a total of data flow in the small cell 1405 (hereinafter, also referred to as a "total data flow") regarding each small cell 1405 in the small cell cluster 1402 as the own management item. Further, the concentrator 1407 has the function of selecting the small cell 1405 to which the UE 1401 is connected.

Each small cell 1405 has the function of measuring a data flow in the own cell, and the function of notifying the measured data flow in the own cell to the concentrator 1407. It is preferable that when notifying the concentrator 1407 of the measured data flow in the own cell, each small cell 1405 notifies the data flow together with the cell identification information of the own cell. The cell identification information of each small cell 1405 is useful when the concentrator 1407 selects the small cell 1405.

As the data flow, for example, information expressing a size of data (hereinafter, also referred to as a "data size") or an amount of data (hereinafter, also referred to as a "data amount") of data handled in each small cell 1405 may be used, and information expressing the data size of the data handled by the transmission data buffer unit when each small cell 1405 transmits the data to the UE 1401 may be used.

As detailed examples of the data flow concerning uplink of each small cell 1405 (hereinafter, also referred to as an "uplink data flow"), the following four examples (1) to (4) will be disclosed.

(1) The data size of the data that each small cell 1405 has transmitted to a higher-level entity or a higher-level node (hereinafter, also referred to as "transmission data").

(2) The data size of the data that each small cell 1405 has received from a lower-level entity or a lower-level node (hereinafter, also referred to as "received data").

(3) Buffer status report (BSR) information that each small cell 1405 has received from the UE 1401 connected to the own cell 1405.

(4) Combination of the examples (1) to (3).

BSR information (hereinafter, also simply referred to "BSR") indicates a state of a buffer unit that temporarily stores data transmitted from the UE 1401 to each small cell 1405. The buffer unit corresponds to the transmission data buffer unit 803 illustrated in FIG. 3 described above. The BSR expresses a flow of received data.

More specifically, the BSR includes information expressing the data size of the data handled by the transmission data buffer unit of the UE 1401. Therefore, by using the BSR, it becomes possible to measure the uplink data flow of each small cell 1405.

In the present embodiment, each small cell 1405 has the function of measuring the data flow. Therefore, in the detailed example (1) of the uplink data flow, the data size may be that of the data that the small cell 1405 has transmitted to the concentrator 1407 being the higher-level node. In the detailed example (2), because the lower-level node becomes the UE 1401, the data size may be that of the data that the small cell 1405 has received from the UE 1401 connected to the own cell 1405. In the detailed example (3), the data size may be the BSR information that the small cell 1405 has received from the UE 1401 connected to the own cell 1405.

In both the detailed examples (1) and (2), the data size may be that for each UE 1401 connected to the small cell 1405, or may be a total data size of all the UEs 1401 connected to the small cell 1405.

In the case of the data size of each UE 1401 connected to the small cell 1405, the concentrator 1407 being the entity that obtains the data flow and selects the cell of a target UE 1401 may derive a total data size of all the UEs 1401 connected to each small cell 1405. Accordingly, it becomes possible to drive the data flow of each small cell 1405. In this case, because it becomes unnecessary for the small cell 1405 to derive the total data size of all the UEs 1401, it becomes possible to simplify the control.

In the case of the total data size of all the UEs 1401 connected to the small cell 1405, the concentrator 1407 being the entity that obtains the data flow and selects the cell of the target UE 1401 may set the total data size as the flow of each small cell 1405. Because the small cell 1405 notifies the total data size of all the UEs 1401 to be connected, as compared with the case of notifying the data size of each UE 1401, it becomes possible to decrease a calculation volume of the concentrator 1407.

Also in the detailed example (3), the data size may be the BSR information of each UE 1401 connected to the small cell 1405, or may be the BSR information of all the UEs 1401 connected to the small cell 1405. Accordingly, it becomes possible to obtain the effects similar to those in the detailed examples (1) and (2).

The BSR information of all the UEs 1401 connected to the small cell 1405 may be a list that expresses a correspondence between the BSR information of each UE 1401 and the identification information of the UE 1401, for example the UE-ID, or may be an uplink data size derived from the BSR information of all the UEs 1401 that the small cell 1405 has received.

Also, considered here is a case where a large number of small cells 1405 are used and the UE 1401 is connected to a plurality of cells. In this case, like the conventional technique, when the BSR is notified to the cell to which the control plane (C-plane) is to be connected, in other cells to which the UE 1401 is connected, the data flow attributable to the UE 1401 cannot be recognized.

In the present embodiment, the data size of each entity to which the UE 1401 is connected, that is, the data size of each cell, or the BSR is notified. The notification of the data size of each entity to which the UE 1401 is to be connected, or the BSR, may be performed on the entity or on the cell to which the control plane (C-plane) is to be connected. In the case where the notification is performed with respect to the cell to which the control plane (C-plane) is to be connected, for the data size or the BSR, a list that expresses a correspondence between the cell identification information and the data size or the BSR may be notified.

By configuring in this way, unlike the case where the BSR is notified to only the cell to which the conventional control plane (C-plane) is to be connected, even in the case where the UE 1401 is connected to a plurality of cells, the network side can recognize the data flow of each entity, that is, each cell.

Further, the data size may be the data size or the BSR information in the user plane (U-plane) connection.

In the case where a large number of small cells 1405 are used and the UE 1401 is connected to a plurality of cells, unlike the conventional technique, there is a case where the cell to which the control plane (C-plane) is to be connected and cell to which the user plane (U-plane) is to be connected are different.

Therefore, in the present embodiment, the data size or the BSR information specified for the entity or the node in the user plane (U-plane) connection is the data flow. Accordingly, it becomes possible to measure the data flow in the user plane (U-plane) connection.

For the measurement of the data flow, the flow during a predetermined period may be measured. As the predetermined period, a start time and a period may be set, or a start time and an end time may be set. The predetermined period may be statically predetermined, or may be set appropriately changeable semi-statically or dynamically. The data flow may be a packet number, a bit number, or a byte number per a predetermined period. Alternatively, the data flow may be a packet number, a bit number, or a byte number per a unit time obtained from the measurement of the data flow during a predetermined period. Change of the predetermined period may be performed by an instruction of the concentrator 1407.

A node or an entity having the function of measuring the data flow notifies an entity or a node having the function of selecting the small cell 1405 to which the target UE 1401 is to be connected, of the information about the data flow.

In the present embodiment, each small cell 1405 is the node having the function of measuring the data flow, and the concentrator 1407 is the entity having the function of selecting the small cell 1405 to which the target UE 1401 is to be connected. In this case, each small cell 1405 notifies the concentrator 1407 of the information about the data flow. The concentrator 1407 receives the information about the data flow from each small cell 1405.

As detailed examples of trigger of notifying the information about the data flow, the following three examples (1) to (3) will be disclosed.

(1) Cyclical or periodical.

(2) By providing a predetermined threshold value, in the case where the data flow becomes equal to or higher than the threshold value, or in the case where the data flow exceeds the threshold value.

(3) In the case where a request has been received from the entity having the function of selecting a small cell.

As the interface to be used to notify the information about the data flow, a new interface may be provided between the small cell 1405 and the concentrator 1407.

In order to decrease the information volume of the data flow, by dividing the data flow into one or a plurality of predetermined ranges, an index may be provided in each range. The index is set as information about the data flow. By such arrangement, it becomes possible to decrease the information volume notified between the nodes, such as the bit number, for example. Therefore, in the case where a large number of small cells 1405 are applied, because the information volume signaled between the nodes can be reduced, it becomes possible to reduce congestion.

In FIG. 8 described above, a case where the BSR is used in the uplink data flow will be described (see Chapter 5.4.5 of 3GPP TS 36.321 V11.2.0 (hereinafter, referred to as "Non-Patent Document 9")). The BSR notified from the UE 1401 is terminated by the small cell 1405 in the standard defined in Non-Patent Document 9.

The BSR is MAC information (see Non-Patent Document 9). According to the conventional base station, for example, the macro cell, a control protocol to the user equipment, for example, a radio resource control (RRC) and a user plane, for example, a packet data convergence protocol (PDCP), a radio link control (RLC), a medium access control (MAC), and a physical layer (PHY) are terminated in the base station. Accordingly, the BSR being the MAC information also becomes the information from the user equipment to the base station.

Therefore, according to the conventional method, in FIG. 8, the BSR becomes the information from a UE 1401 to the small cell 1405 connected to the UE 1401.

According to the conventional method, the entity other than the eNB being the base station directly connected to the UE 1401 cannot realize selection of a connection cell based on the data flow of the cell.

Therefore, in the present embodiment, the BSR information is arranged to be notified from the small cell 1405 to the concentrator 1407.

By using the data size of the transmission data notified from the BSR, the concentrator 1407 selects the small cell 1405 to which the UE 1401 is to be connected.

The concentrator 1407 notifies the small cell 1405 to which the target UE 1401 is currently connected, of the information of the selected small cell 1405 as the information of the small cell 1405 to which the UE 1401 is to be connected. The information of the selected small cell 1405 may be notified together with the identifier of the target UE 1401.

The small cell 1405 to which the UE 1401 is currently connected receives the information of the small cell 1405 to which the target UE 1401 is to be connected, and transmits an RRC reconfiguration message, so that the information of the small cell 1405 to be connected is notified to the UE 1401.

The UE 1401 executes connection to the small cell 1405 which the concentrator 1407 has selected, by using the received RRC reconfiguration message.

In the case where the RRC connection is not being performed between the small cell 1405 to which the UE 1401 is currently connected and the UE 1401, the concentrator 1407 may notify the cell that has the RRC connection with the UE 1401 of the information of the small cell 1405 to which the UE 1401 is to be connected. The information of the small cell 1405 to which the UE 1401 is to be connected may be notified together with the identifier of the target UE 1401.

The cell that has the RRC connection with the UE 1401 receives the information of the small cell 1405 to which the target UE 1401 is to be connected, and transmits an RRC reconfiguration message, so that the information of the small cell 1405 to be connected is notified to the UE 1401.

For example, in the case where the cell that has the RRC connection with the UE 1401 is the macro cell 1406, the concentrator 1407 notifies the macro cell 1406 of the information of the small cell 1405 to which the UE 1401 is to be connected. The macro cell 1406 receives the information of the small cell 1405 to which the target UE 1401 is to be connected, and transmits the RRC reconfiguration message, so that the information of the small cell 1405 to be connected is notified to the UE 1401.

The UE 1401 executes connection to the small cell 1405 which the concentrator 1407 has selected, by using the received RRC reconfiguration message.

In the case where a connection destination has been notified for a target cell of handover, the UE 1401 executes handover to the notified small cell 1405 to be connected.

In the case where a connection destination has been notified as a secondary cell of carrier aggregation, the UE 1401 configures the notified small cell 1405 to be connected, as the secondary cell.

Figure 11:
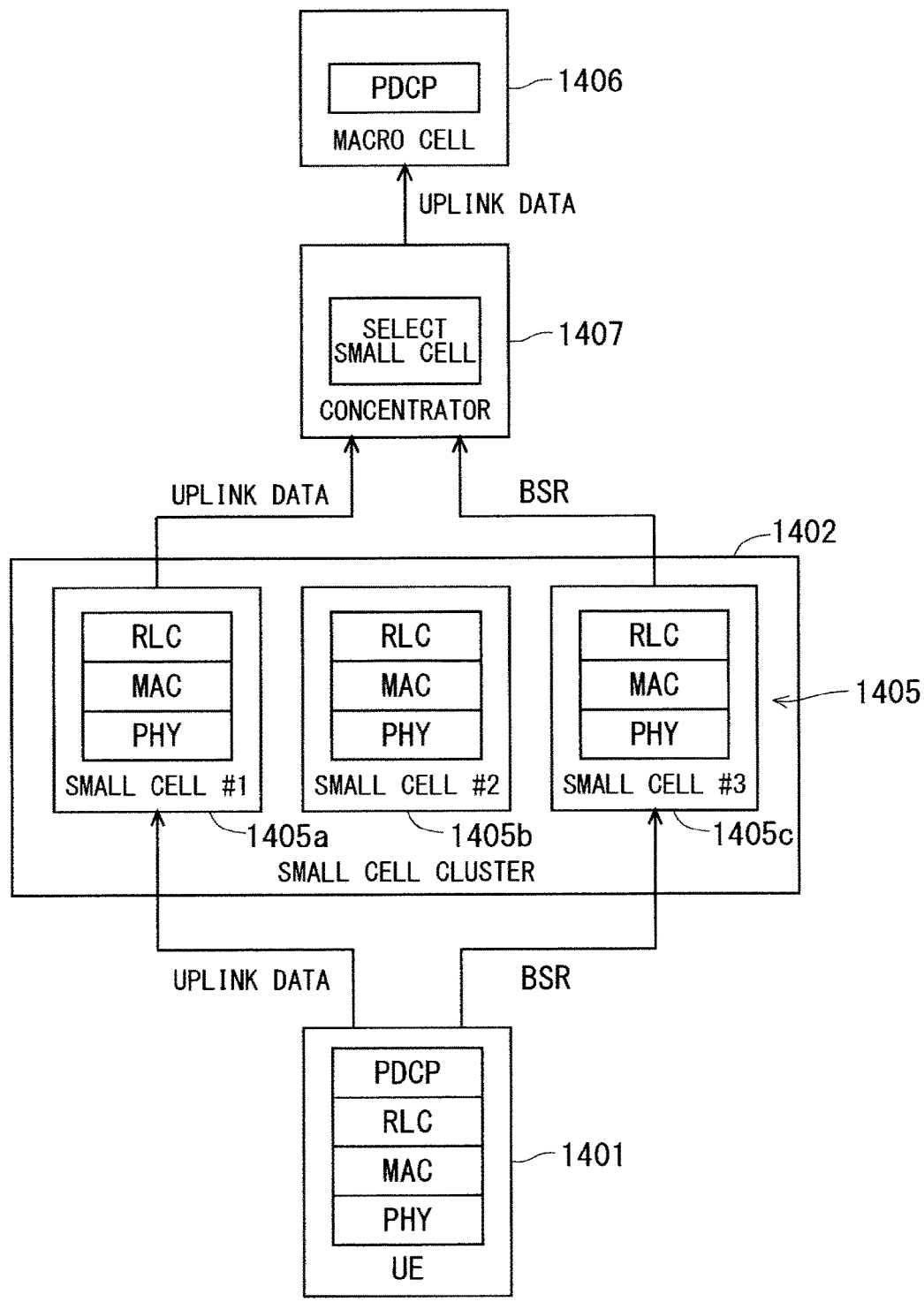
FIG. 11 is a diagram showing the configuration of a protocol stack in the communication system 1400 according to the first embodiment of the present invention.

FIG. 10 is a diagram showing the configuration of the protocol stack in the communication system 1410 according to the conventional technique. FIG. 11 is a diagram showing the configuration of the protocol stack in the communication system 1400 according to the first embodiment of the present invention.

According to the macro cell 1406 being the conventional base station, the user plane terminates up to PDCP, that is, the PDCP, RLC, MAC, and PHY. On the other hand, in the present embodiment, the small cell 1405 terminates the RLC, MAC, and PHY, and the macro cell 1406 terminates the PDCP.

The concentrator 1407 has the function of selecting the small cell 1405 connected to the target UE 1401.

The BSR information is notified from the UE 1401 to the small cell 1405. The small cell 1405 further notifies the concentrator 1407 of the BSR information. For example, the BSR information is notified from the UE 1401 to a third small cell #3 1405*c*, and is notified from the third small cell #3 1405*c* to the concentrator 1407.

Accordingly, the concentrator 1407 can obtain an uplink data flow of each small cell 1405, and can select the small cell 1405 to be connected to the target UE 1401, by using the uplink data flow.

The uplink data from the target UE 1401 is to be transmitted to the macro cell 1406 through the small cell 1405 selected by the concentrator 1407. For example, in the case where the small cell 1405 selected by the concentrator 1407, to be connected to the target UE 1401 is the first small cell #1 1405*a*, the uplink data from the UE 1401 is transmitted to the macro cell 1406 through the first small cell #1 1405*a*.

In this way, in selecting the small cell 1405 to be connected to the UE 1401, by using the information about the data flow, it becomes possible to avoid selecting the small cell 1405 of a large uplink data flow, for example. Accordingly, the process load of the small cell 1405 can be dispersed. Therefore, it becomes possible to improve a delay in the entire network.

When the BSR has been received from the UE 1401, the small cell 1405 may use the difference between the Short BSR and the Long BSR, for deciding whether the BSR is to be transmitted to the concentrator 1407.

For example, by including in the Short BSR the information of the data amount of the transmission data of the DCCH, and by including in the Long BSR the information of the data amount of the transmission data of the DTCH, the small cell 1405 may notify only the information of the Long BSR to the concentrator 1407.

Accordingly, the concentrator 1407 can recognize the data amount of the transmission data of the user plane (U-plane) from the information of the Long BSR, and can select the small cell 1405, by using the data amount of the transmission data of the user plane (U-plane). Therefore, it becomes possible to decrease the data amount of communication between the small cell 1405 and the concentrator 1407.

As detailed examples of trigger of notifying the information about the data flow, in place of the above detailed examples (1) to (3), the following method may be employed.

In FIG. 8 described above, when the concentrator 1407 has received the BSR, in the case where the small cell 1405 not transmitting the BSR exists during a predetermined time in the small cell cluster 1402 that the concentrator 1407 manages, the concentrator 1407 may inquire the small cell 1405 about the total data flow.

Accordingly, the concentrator 1407 can select the optimum small cell 1405, after recognizing the data flow in the small cell 1405 included in the small cell cluster 1402.

Further, the small cell 1405 may periodically transmit the BSR to the concentrator 1407, regardless of presence or absence of the reception of the BSR from the UE 1401.

Next, as detailed examples of the data flow concerning downlink (hereinafter, also referred to as a "downlink data flow") of each small cell 1405, the following three examples (1) to (3) will be disclosed.

(1) A data size of the data that each small cell 1405 has received from the higher-level entity or the higher-level node.

(2) A data size of the data that each small cell 1405 has transmitted to the lower-level entity or the lower-level node.

(3) Combination of the examples (1) and (2).

In the present embodiment, the small cell 1405 has the function of measuring the data flow. Therefore, in the detailed example (1) of the downlink data flow, the data size may be that of the data that the small cell 1405 has received from the concentrator 1407 being the higher-level node. In the detailed example (2), because the lower-level node becomes the UE 1401, the data size may be that of the data that the small cell 1405 has transmitted to the UE 1401 connected to the own cell 1405.

In both the detailed examples (1) and (2), the data size may be that for each UE 1401 connected to the small cell 1405, or may be a total data size of all the UEs 1401 connected to the small cell 1405. This is similar to the case of the uplink data flow.

The data size may be that in the user plane (U-plane) connection. This is similar to the case of the uplink data flow.

For the measurement period of the data flow, notification of the data flow, trigger of notification of the data flow, the interface for the notification of the data flow, and the like, the interface and the like disclosed concerning the uplink can be appropriately applied. By appropriately applying in this way the interface and the like disclosed concerning uplink, the effect similar to that in the case of uplink can be obtained.

In FIG. 8, as the downlink data flow, a case where the data size of the data transmitted to the lower-level entity or the lower-level node is used will be described.

The small cell 1405 measures a data size of the data transmitted from the own cell 1405 to the UE 1401 to be connected to the own cell 1405, and notifies the concentrator 1407 of the measured data size of the data transmitted to the UE 1401. The concentrator 1407 selects the small cell 1405 to which the target UE 1401 is to be connected, by using the downlink data flow of each small cell 1405 in the small cell cluster 1402 that the concentrator 1407 manages.

As the method for the concentrator 1407 to notify the target UE 1401 of the small cell 1405 which has been selected as the small cell 1405 to which the UE 1401 is to be connected, it is possible to apply the method disclosed by the method of notifying the uplink data flow.

In the case where a connection destination has been notified for a target cell of handover, the UE 1401 executes handover to the notified small cell 1405 to be connected.

In the case where a connection destination has been notified as a secondary cell of the carrier aggregation, the UE 1401 configures the notified small cell 1405 to be connected as the secondary cell.

The entity having the function of selecting the small cell 1405 to which the target UE 1401 is to be connected may select the small cell 1405, by using both the uplink data flow and the downlink data flow, or by using one of the data flow. By using both the uplink data flow and the downlink data flow, in the case where the target UE 1401 performs bidirectional communication, it becomes possible to select the optimum small cell 1405.

In the case where the link that is required to have high throughput and the like to the target UE 1401 is one of uplink and downlink, the small cell 1405 may be selected by using the data flow of one link. Accordingly, it becomes possible to select the small cell 1405 that is optimum for communication of the UE 1401.

The entity having the function of measuring the data flow may notify the entity having the function of selecting the small cell 1405 to which the target UE 1401 is connected, of the uplink data flow and the downlink data flow together. The data flow of each link may be notified in the list format, or may be a total value. Accordingly, it becomes possible to decrease the message volume to be notified.

The small cell 1405 to which the UE 1401 is to be connected may be selected independently of uplink and downlink. By using the uplink data flow and the downlink data flow in uplink and downlink respectively, it becomes possible to select the optimum small cell 1405 in each link.

For example, the small cells 1405 in the small cell cluster 1402 are configured by the same frequency band and the same TAG. In the case of selecting the small cell 1405 to which the target UE 1401 is connected in the small cell cluster 1402, the small cell 1405 to which the UE 1401 is connected may be different between downlink (DL) and uplink (UL). The concentrator 1407 executes selection of the small cell 1405 independently of downlink (DL) and uplink (UL).

Because the small cells 1405 in the small cell cluster 1402 are configured by the same frequency band and the same TAG, transmission timings in uplink to the small cell 1405 selected in downlink become the same. Therefore, even when any small cell 1405 is used in uplink, it is not necessary to change the transmission timing, and it becomes possible to simplify the control in the UE 1401.

Further, in both uplink and downlink, because the optimum small cell 1405 can be selected, it becomes possible to realize high throughput and a low delay in both links.

For example, the small cells 1405 in the small cell cluster 1402 are configured by the same TA (Tracking Area). In the case of selecting the small cell 1405 to which the target UE 1401 is connected in the small cell cluster 1402, the small cell 1405 to which the UE 1401 is connected may be different between downlink (DL) and uplink (UL). The concentrator 1407 executes selection of the small cell 1405 independently of downlink (DL) and uplink (UL). Because the small cells 1405 in the small cell cluster 1402 are configured by the same TA and TAC, it is not necessary to execute the procedure of TAU (Tracking Area Update), and it becomes possible to simplify the control.

In the function of selecting the small cell 1405 to which the UE 1401 is to be connected, as detailed examples of information used for the selection, the following five examples (1) to (5) will be disclosed.

(1) Data flow
(2) Load
(3) Communication quality
(4) Quality of service (QoS)
(5) Combination of the examples (1) to (4).

In selecting the cell, a load state of the small cell 1405 and communication quality may be considered. Considered here is a case where transfer load is high because communication quality is low although the flow is small.

In selecting the cell, the QoS required in the data may be considered. For example, as the data that is required to have a lower packet error loss rate as the QoS, the small cell 1405 of high communication quality may be selected.

The data flow in the detailed example (1) described above includes at least either one of the uplink data flow and the downlink data flow. Because this has been described above, the description will be omitted here.

The load in the detailed example (2) described above includes a data delivery delay time, throughput, the number of UEs 1401 connected to the small cell 1405, a using rate of the CPU (Central Processing Unit), a using rate of radio resources, and a buffer stay amount in at least either one of the uplink data and the downlink data, for example.

Each small cell 1405 has the function of measuring the load, and each small cell 1405 notifies the concentrator 1407 of the information about the load (hereinafter, also referred to as "load information"). The concentrator 1407 receives the load information from each small cell 1405. The concentrator 1407 selects the small cell 1405 to which the target UE 1401 is to be connected, by using the notified load information.

For the measurement period of load, notification of load information, the trigger of notification of the load information, the interface for the notification of the load information, and the like, the method disclosed concerning the data flow can be appropriately applied. Accordingly, it becomes possible to obtain the effects similar to those in the method disclosed concerning the data flow.

As detailed examples of communication quality in the detailed example (3) above, the following nine examples (3-1) to (3-9) will be disclosed.

First, concerning downlink, the following four examples (3-1) to (3-4) will be disclosed.

(3-1) The number of times of ACK/NACK of the HARQ to the downlink data
(3-2) The number of times of ACK/NACK of the RLC to the downlink data
(3-3) CQI
(3-4) CSI Next, concerning uplink, the following five examples (3-5) to (3-9) will be disclosed.

(3-5) The number of times of ACK/NACK of the HARQ to the uplink data
(3-6) The number of times of ACK/NACK of the RLC to the uplink data
(3-7) The received power of the sounding reference signal (SRS) transmitted from the UE to the small cell
(3-8) Reception quality of the PUCCH. This may be the reception quality of the DM-RS of the PUCCH.
(3-9) Reception quality of the PUSCH. This may be the reception quality of the DM-RS of the PUSCH.

The number of times of ACK/NACK of the HARQ to the downlink data, the CQI, and the CSI are the information that the physical layer provides to the MAC layer (see Chapter 4.3.2 of Non-Patent Document 9). The MAC operates the HARQ (see Chapter 5.3.2 of Non-Patent Document 9).

According to the conventional base station, for example, in the macro cell, a control protocol to the user equipment, for example, a radio resource control (RRC) and a user plane, for example, a packet data convergence protocol (PDCP), a radio link control (RLC), a medium access control (MAC), and a physical layer (PHY) terminate in the base station. Accordingly, the number of times of ACK/NACK of the HARQ to the downlink data, the CQI, and the CSI being the information that the physical layer provides to the MAC layer also become the information from the user equipment to the base station.

Therefore, the number of times of the ACK/NACK of the RLC becomes the information of the base station that terminates the RLC protocol.

The number of times of ACK/NACK to the uplink data of the HARQ that the MAC operates becomes the information of the base station.

The received power of a sounding reference signal (SRS), the reception quality of the PUCCH, and the reception quality of the PUSCH, being the measurement information of the reception quality of the radio sections, become the information of the base station.

Therefore, according to the conventional method, it is impossible for the entity other than the eNB being the base station directly connected to the UE 1401 to realize the selection of the connection cell based on the communication quality.

Then, in the present embodiment, the small cell 1405 notifies the entity or the node having the function of selecting the small cell 1405 to which the target UE 1401 is to be connected, of the communication quality.

The entity or the node having the function of selecting the small cell 1405 to which the target UE 1401 is connected, selects the small cell 1405 to which the UE 1401 is to be connected, by using the notified communication quality.

For the measurement period of communication quality, notification of communication quality information, trigger of notification of the communication quality information, the interface for the notification of the communication quality information, and the like, the method disclosed concerning the data flow can be appropriately applied. Accordingly, it becomes possible to obtain the effects similar to those in the method disclosed concerning the data flow.

As detailed examples of the QoS in the detailed example (4) described above, the following six examples (4-1) to (4-6) will be disclosed.

(4-1) QoS class identifier (QCI)
(4-2) Allocation and retention priority (ARP)
(4-3) Guaranteed bit rate (GBR)
(4-4) Maximum bit rate (MBR)
(4-5) Packet delay
(4-6) Packet error loss rate The entity having the QoS information notifies the entity having the function of selecting the small cell 1405 to which the target UE 1401 is to be connected, of the information of the QoS.

For the notification of the QoS information, trigger of notification of the QoS information, the interface for the notification of the QoS information, and the like, the method disclosed concerning the data flow can be appropriately applied. Accordingly, it becomes possible to obtain the effects similar to those in the method disclosed concerning the data flow.

In the detailed example (5) described above, the small cell 1405 may have the function of measuring the data flow by the combination of the pieces of information.

The small cell 1405 may notify the concentrator 1407 of the pieces of information at different timings, or may notify one or a plurality of pieces of information at the same timing.

Further, the concentrator 1407 may select the small cell 1405 to which the target UE 1401 is to be connected, by using a part or the whole of the information received from each small cell 1405.

Accordingly, depending on the wave environment between the target UE 1401 and the small cell 1405 in the small cell cluster 1402, it becomes possible to appropriately change the small cell 1405 to be selected. Therefore, it becomes possible to select the optimum small cell 1405.

By employing the method disclosed in the present embodiment while the concentrator 1407 uses the information about the data flow when selecting the small cell 1405 to be connected to the UE 1401, it becomes possible to disperse the process load of the small cell 1405. Therefore, it becomes possible to improve a delay in the entire network.

When the concentrator 1407 selects the small cell 1405 to be connected to the UE 1401, it becomes possible to use other various pieces of information, and becomes possible to select the small cell 1405 which is more optimum for communication. Accordingly, communication with high throughput and a low delay becomes possible.

As described above, according to the present embodiment, the small cell 1405 to which the UE 1401 is to be connected is selected from among a plurality of small cells 1405, based on the flow of at least either one of the received data that each small cell 1405 receives from the UE 1401 and the transmission data that each small cell 1405 transmits to the UE 1401. Accordingly, in the case where the traffic volume in the communication system 1400 has increased, load can be dispersed to each cell 1405 that configures the small cell cluster 1402. Therefore, because concentration of traffic in a specific small cell 1405 can be prevented, it is possible to reduce the occurrence probability of a delay in the network and loss of data.

In the present embodiment, the communication system 1400 includes the concentrator 1407. The concentrator 1407 selects the small cell 1405 to which the UE 1401 is to be connected from among a plurality of the small cells 1405, based on the flow of at least either one of the received data that each small cell 1405 receives from the UE 1401 and the transmission data that each small cell 1405 transmits to the UE 1401.

By providing the concentrator 1407, it becomes possible to realize, in a simple configuration, the communication system 1400 capable of reducing the occurrence probability of a delay in the network and loss of data as described above.

In the present embodiment, the flow of the received data is expressed by the BSR information. The BSR information is transmitted from the UE 1401 to the small cell 1405, and is also transmitted from the small cell 1405 to the concentrator 1407 or other higher-level device. The concentrator 1407 or other higher-level device that has received the BSR information from the small cell 1405 selects the small cell 1405 to which the UE 1401 is to be connected, from among a plurality of small cells 1405, based on the BSR information.

By selecting the small cell 1405 that the UE 1401 is to be connected based on the BSR information in this way, it becomes possible to select the small cell 1405 which is more optimum for communication. Accordingly, communication with high throughput and a low delay becomes possible.

Further, in the present embodiment, the communication system 1400 includes the macro cell 1406 and a plurality of the small cells 1405. From among a plurality of small cells 1405, the small cell 1405 to which the UE 1401 is to be connected is selected based on the flow of at least either one of the received data and the transmission data of each small cell 1405. Accordingly, in the case where a large number of small cells 1405 are installed, the process load can be properly dispersed to each small cell 1405. Therefore, it becomes possible to more securely improve a delay in the entire network.

First Embodiment Modification 1

In the example disclosed in the first embodiment, the small cell 1405 has the function of measuring the data flow. In the present modification, the concentrator 1407 has the function of measuring the data flow of each small cell 1405.

In this case, concerning uplink, the data size of the data received from each small cell 1405 being the lower-level entity may be measured. Concerning downlink, the data size of the data transmitted to each small cell 1405 being the lower-level entity may be measured. By such arrangement, the concentrator 1407 can measure the data flow of each small cell 1405.

By arranging such that the concentrator 1407 has the function of measuring the data flow of each small cell 1405, it becomes possible to make the entity of measuring the data flow the same as the entity of selecting the small cell 1405 to be connected to the UE 1401.

Accordingly, because it becomes unnecessary for each small cell 1405 to notify the concentrator 1407 of a measured result of the data flow, it becomes possible to decrease the signaling volume. Further, because measurement and selection can be unified in the concentrator 1407, a measurement timing can be flexibly configured. Therefore, it becomes possible to select more timely a dynamic small cell 1405.

First Embodiment Modification 2

In the example disclosed in the first embodiment, the concentrator 1407 has the function of selecting the small cell 1405 to which the UE 1401 is to be connected. In the present modification, the macro cell 1406 has the function of selecting the small cell 1405 to which the UE 1401 is to be connected.

In this case, the entity having the function of measuring the data flow notifies the macro cell 1406 of the data flow of each small cell 1405. The macro cell 1406 obtains the data flow of each small cell 1405. The macro cell 1406 selects the small cell 1405 to be connected to the UE 1401, by using the data flow of each small cell 1405.

The macro cell 1406 notifies the UE 1401 of the information of the selected small cell 1405. This information may be notified through the small cell 1405 connected to the concentrator 1407 and the UE 1401, and when the UE 1401 is connected to the macro cell 1406, the information may be directly notified from the macro cell 1406 to the UE 1401. For the method of notification from the small cell 1405 or the macro cell 1406 to the UE 1401, the method disclosed in the first embodiment can be applied.

For example, in the case where each small cell 1405 has the function of measuring the data flow of the own cell 1405, each small cell 1405 may notify the measured data flow of the own cell 1405 to the macro cell 1406 through the concentrator 1407.

By such arrangement, it becomes unnecessary to increase the function of the concentrator 1407. Therefore, in the case of configuring the concentrator 1407 separately from the macro cell 1406, it becomes possible to facilitate the configuration of the concentrator 1407.

First Embodiment Modification 3

According to the example disclosed in the first embodiment, in the user plane (U-plane) connection between the UE 1401 to be connected to the small cell 1405 and the S-GW 1404, the S-GW 1404 is connected to the concentrator 1407 through the macro cell 1406.

In the present modification, in the user plane (U-plane) connection between the UE 1401 to be connected to the small cell 1405 and the S-GW1404, the S-GW1404 is directly connected to the concentrator 1407. Accordingly, the S-GW1404 and the small cell 1405 are connected to each other through the concentrator 1407 without through the macro cell 1406.

Therefore, because the user plane (U-plane) data handled in the small cell 1405 does not pass through the macro cell 1406, it becomes possible to decrease the process in the macro cell 1406.

In this case, the concentrator 1407 may have the PDCP to the UE 1401, or the small cell 1405 may have the PDCP.

Second Embodiment

FIG. 12 is a block diagram showing the configuration of a communication system 1500 according to a second embodiment of the present invention. The communication system 1500 according to the present embodiment is configured to include an UE 1501, a small cell cluster 1502, an MME 1503, an S-GW 1504, and a macro cell 1506.

The small cell cluster 1502 includes one or a plurality of small cells 1505. FIG. 12 illustrates a case where the small cell cluster 1502 includes three small cells 1505.

In the following description, in the case of distinctly indicating three small cells 1505, by adding suffixes "a", "b", and "c" to the reference "1505", the small cells 1505 will be respectively indicated as a first small cell #1 1505*a*, a second small cell #2 1505*b*, and a third small cell #3 1505*c*. In the case of indicating three small cells 1505 without distinction, the small cell will be indicated by adding a reference "1505".

In the first embodiment, as illustrated in FIG. 8, the concentrator 1407 is configured separately from the macro cell 1406. On the other hand, in the present embodiment, the macro cell 1506 has the function of a concentrator 1507 as well. That is, the macro cell 1506 includes the concentrator 1507.

The function of the concentrator 1507 is the function of collectively controlling the small cells 1505 in the small cell cluster 1502 including one or a plurality of small cells 1505, in a similar manner to that of the concentrator 1407 disclosed in the first embodiment.

In the present embodiment, the function of the concentrator 1507 is added to the macro cell 1506. The user plane (U-plane) connection between the UE 1501 to be connected to the small cell 1505 and the S-GW 1504 is performed through the macro cell 1506.

The macro cell 1506 has the function of obtaining the data flow and the function of selecting the small cell 1505 to which the UE 1501 is to be connected, for each small cell 1505 in the small cell cluster 1502 being the management item of the function of the concentrator 1507 that the macro cell 1506 has.

Each small cell 1505 has the function of measuring the data flow, and the function of notifying the macro cell 1506 having the function of the concentrator 1507, of the measured data flow.

In the configuration illustrated in FIG. 12, by appropriately employing the method disclosed in the first embodiment while the macro cell 1506 uses the information about the data flow when selecting the small cell 1505 to be connected to the UE 1501, it becomes possible to disperse the process load of the small cell 1505. Therefore, it becomes possible to improve a delay in the entire network.

When the macro cell 1506 selects the small cell 1505 to be connected to the UE 1501, it becomes possible to use other various pieces of information, and becomes possible to select the small cell 1505 which is more optimum for communication. Accordingly, communication with high throughput and a low delay becomes possible.

Further, in the case where the UE 1501 is connected to not only one or more small cells 1505 but also to the macro cell 1506, the macro cell 1506 can select the small cell 1505 to be connected to the UE 1501. Accordingly, it becomes possible to put together in the macro cell 1506 the control to the UE 1501. Therefore, it becomes possible to reduce malfunction.

The macro cell 1506 having the function of the concentrator 1507 may have the function of measuring the data flow of each small cell 1505.

In this case, concerning uplink, the data size of the data received from each small cell 1505 being the lower-level entity may be measured. Concerning downlink, the data size of the data transmitted to each small cell 1505 being the lower-level entity may be measured.

By such arrangement, the macro cell 1506 can measure the data flow of each small cell 1505. Accordingly, because it becomes unnecessary for each small cell 1505 to notify the macro cell 1506 of a measured result of the data flow, it becomes possible to decrease the signaling volume. Therefore, it becomes possible to obtain the effects similar to those in the first embodiment.

In the present embodiment, as illustrated in FIG. 12, the user plane (U-plane) connection between the UE 1501 to be connected to the small cell 1505 and the S-GW 1504 is performed through the macro cell 1506.

In the user plane (U-plane) connection between the UE 1501 to be connected to the small cell 1505 and the S-GW 1504, the S-GW 1504 may be directly connected to the small cell 1505. In this case, the S-GW 1504 is connected to the small cell 1505 without through the macro cell 1506.

Therefore, because the user plane (U-plane) data handled in the small cell 1505 does not pass through the macro cell 1506, it becomes possible to decrease the process in the macro cell 1506. In this case, the small cell 1505 may have the PDCP to the UE 1501.

In the user plane (U-plane) connection between the UE 1501 to be connected to the small cell 1505 and the S-GW 1504, in the case where the S-GW 1504 is directly connected to the small cell 1505, the S-GW 1504 may have the function of measuring the data flow of each small cell 1505.

In this case, concerning uplink, the data size of the data received from each small cell 1505 being the lower-level entity may be measured. Concerning downlink, the data size of the data transmitted to each small cell 1505 being the lower-level entity may be measured.

By such arrangement, the S-GW 1504 can measure the data flow of each small cell 1505.

The S-GW 1504 notifies the entity that selects the small cell 1505 to be connected to the UE 1501, of the measured data flow of each small cell 1505. For example, in the case where the entity that selects the small cell 1505 to be connected to the UE 1501 is the macro cell 1506, the S-GW 1504 notifies the macro cell 1506 of the data flow. The S-GW 1504 may notify the macro cell 1506 of the data flow through the MME 1503.

Accordingly, because it becomes unnecessary for the small cell 1505 to notify the macro cell 1506 of a measured result of the data flow, it becomes possible to decrease the signaling volume between the small cell 1505 and the macro cell 1506.

As described above, according to the present embodiment, the macro cell 1506 has the function of the concentrator 1507. Accordingly, because it becomes unnecessary for each small cell 1505 to notify the macro cell 1506 of a measured result of the data flow, it becomes possible to decrease the signaling volume. Therefore, it is possible to further improve a delay in the entire network.

Third Embodiment

Figure 13:
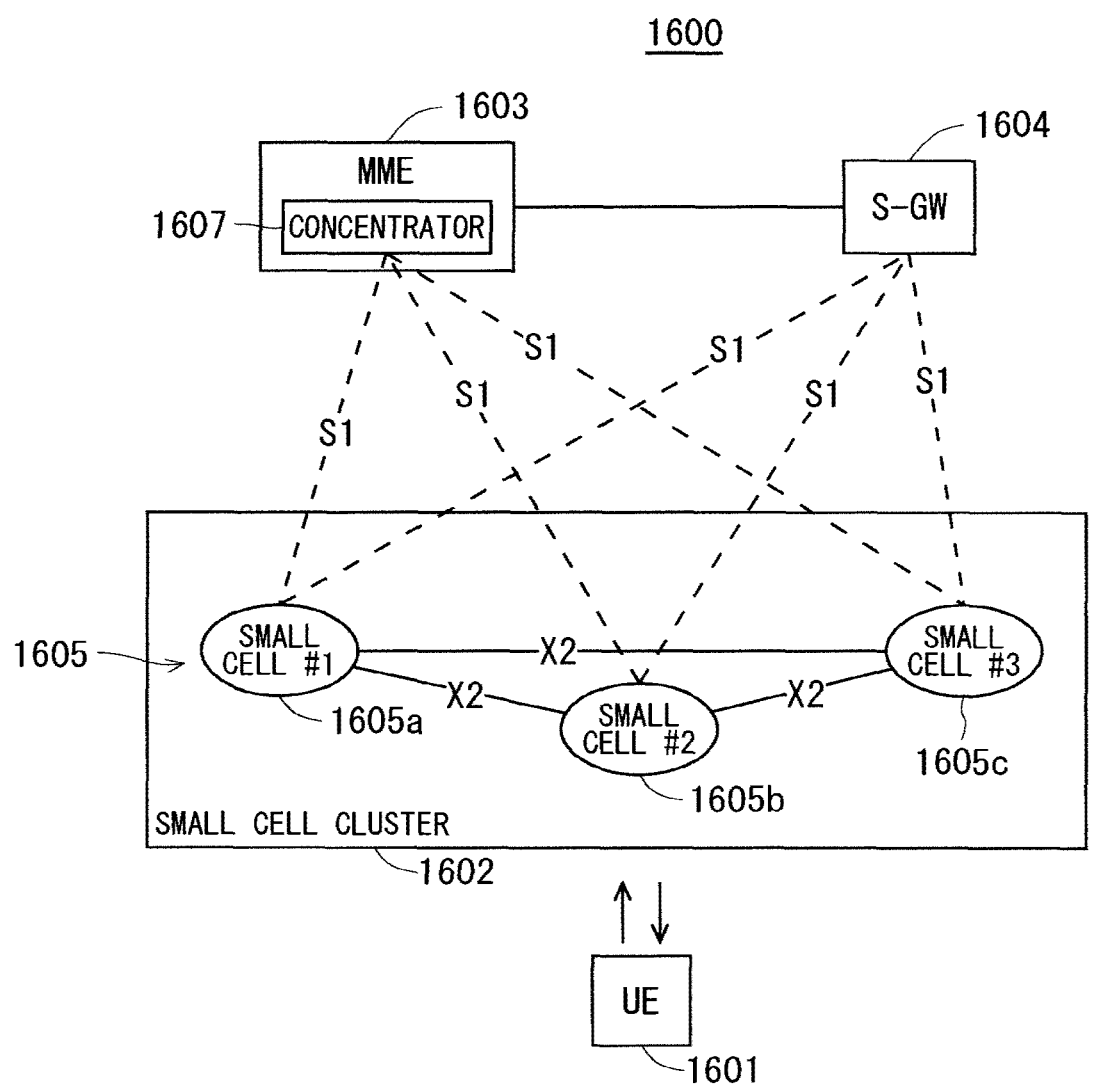
FIG. 13 is a block diagram showing the configuration of a communication system 1600 according to a third embodiment of the present invention.

FIG. 13 is a block diagram showing the configuration of a communication system 1600 according to a third embodiment of the present invention. The communication system 1600 according to the present embodiment is configured to include a UE 1601, a small cell cluster 1602, an MME 1603, and an S-GW 1604. The small cell cluster 1602 includes one or a plurality of small cells 1605. FIG. 13 illustrates a case where the small cell cluster 1602 includes three small cells 1605.

In the following description, in the case of distinctly indicating three small cells 1605, by adding suffixes "a", "b", and "c" to the reference "1605", the small cells 1605 will be respectively indicated as a first small cell #1 1605a, a second small cell #2 1605b, and a third small cell #3 1605c. In the case of indicating three small cells 1605 without distinction, the small cell will be indicated by adding a reference "1605".

In the second embodiment, as illustrated in FIG. 12, the macro cell 1506 has the function of the concentrator 1507 as well. On the other hand, in the present embodiment, the MME 1603 has the function of a concentrator 1607 as well. That is, the MME 1603 includes the concentrator 1607.

The function of the concentrator 1607 is the function of collectively controlling the small cells 1605 in the small cell cluster 1602 including one or a plurality of small cells 1605, in a similar manner to that of the concentrator 1407 disclosed in the first embodiment.

In the present embodiment, the function of the concentrator 1607 is added to the MME 1603. The MME 1603 is directly connected to each small cell 1605. Further, the S-GW 1604 is directly connected to each small cell 1605.

The MME 1603 has the function of obtaining the data flow and the function of selecting the small cell 1605 to which the UE 1601 is to be connected, for each small cell 1605 in the small cell cluster 1602 being the management item of the function of the concentrator 1607 that the MME 1603 has.

Each small cell 1605 has the function of measuring the data flow, and the function of notifying the MME 1603 having the function of the concentrator 1607, of the measured data flow.

In the present embodiment, in the configuration illustrated in FIG. 13, the method disclosed in the first embodiment may be appropriately used. The MME 1603 may notify the UE 1601 of the information of the selected small cell 1605, through the small cell 1605 connected to the UE 1601.

By such arrangement, when the MME 1603 selects the small cell 1605 to be connected to the UE 1601, it becomes possible to use the information about the data flow. Accordingly, the process load of the small cell 1605 can be dispersed. Therefore, it is possible to improve a delay in the entire network.

When the MME 1603 selects the small cell 1605 to be connected to the UE 1601, it becomes possible to use other various pieces of information, and becomes possible to select the small cell 1605 which is more optimum for communication. Accordingly, communication with high throughput and a low delay becomes possible.

Because the MME 1603 has the function of selecting the small cell 1605 to be connected to the UE 1601, the information of the small cell 1605 to be connected to the UE 1601 can be directly notified to the S-GW 1604. Therefore, a signaling volume required by the network side can be small.

Further, after the MME 1603 has selected the small cell 1605 to which the UE 1601 is to be connected, the S-GW 1604 can perform with a low-level delay time the routing of data to one or more small cells 1605 to which the UE 1601 is to be connected. Therefore, it becomes possible to flexibly change the small cell 1605 to which the UE 1601 is to be connected with a lower delay. Therefore, it becomes possible to select the small cell 1605 corresponding to the continuously changing surrounding wave environment.

According to the first embodiment to the third embodiment described above, one small cell cluster 1402, 1502, or 1602 exists in the communication system 1400, 1500, or 1600. The number of small cell clusters 1402, 1502 and 1602 that exist in the communication systems 1400, 1500, and 1600 is not limited to one. In the communication systems 1400, 1500, and 1600, a plurality of small cell clusters 1402, 1502, and 1602 may exist.

In the case where a plurality of small cell clusters 1402, 1502, and 1602 exist in the communication systems 1400, 1500, and 1600, a plurality of concentrators 1407, 1507, and 1607 are configured corresponding to the small cell clusters 1402, 1502, and 1602. In this case, by applying the method disclosed in each embodiment, it is possible to select the concentrators 1407, 1507, and 1607 that control the small cells 1405, 1505, and 1605 to be connected to the UEs 1401, 1501, and 1601.

For example, considered here is a case where the macro cell 1406 is connected to the concentrator 1407 corresponding to each small cell cluster 1402, like the first embodiment illustrated in FIG. 8. In this case, the macro cell 1406 is configured to have the function of obtaining the data flow in each small cell cluster 1402, and the function of selecting to which small cell 1405 in the small cell cluster 1402 the UE 1401 is to be connected.

Further, in this case, each small cell cluster 1402 is configured to have the function of measuring the data flow, and the function of notifying the macro cell 1406 of the measured data flow, through the concentrator 1407.

Without being limited to the above, by providing each small cell 1405 with the function of measuring the data flow, each small cell 1405 may notify the small cell cluster 1402 to which the UE 1401 is connected, of the measured data flow. Each small cell cluster 1402 derives the data flow of the entire small cells 1405 belonging to the own cluster.

In the above configuration, by appropriately employing the method disclosed in the first embodiment while the macro cell 1406 uses the information about the data flow of each small cell cluster 1402 when selecting the small cell 1405 to be connected to the UE 1401, it becomes possible to disperse the process load of the small cell cluster 1402. Therefore, it becomes possible to improve a delay in the entire network.

The embodiments and the modifications thereof described above are merely exemplifications of the present invention, and the embodiments and the modifications thereof can be freely combined without departing from the scope of the present invention. Further, an arbitrary component in the embodiments and the modifications thereof can be appropriately changed or omitted. Accordingly, by installing small eNBs configuring a small cell, a communication system that obtains a high communication capacity can be provided.

For example, according to another embodiment of the present invention, the communication system may be a communication system including a communication terminal device, and one or a plurality of base station devices that perform radio communication with the communication terminal device. The communication system includes a plurality of cells that are configured by the one or the plurality of base station devices, and perform radio communication with the communication terminal device by being connected to the communication terminal device, and a higher-level device that is provided in a higher level of the base station device. A cell to which the communication terminal device is to be connected is selected from among the plurality of cells, based on a flow of received data that each cell has received from the communication terminal device.

Accordingly, as in the case with each of the embodiments and the modification thereof described above, when the traffic volume in the communication system has increased, the load can be dispersed to each cell. Therefore, because concentration of traffic in a specific cell can be prevented, it is possible to reduce the occurrence probability of a delay in the network and loss of data.

Further, according to still another embodiment of the present invention, the communication system may be a communication system including a communication terminal device, and one or a plurality of base station devices that perform radio communication with the communication terminal device. The communication system includes a plurality of cells that are configured by the one or the plurality of base station devices, and perform radio communication with the communication terminal device by being connected to the communication terminal device, and a higher-level device that is provided in a higher level of the base station device. A cell to which the communication terminal device is to be connected is selected from among the plurality of cells, based on a flow of transmission data which each cell has transmitted to the higher-level device.

Accordingly, as in the case with each of the embodiments and the modification thereof described above, when the traffic volume in the communication system has increased, the load can be dispersed to each cell. Therefore, because concentration of traffic in a specific cell can be prevented, it is possible to reduce the occurrence probability of a delay in the network and loss of data.

While the present invention has been shown and described in detail, the foregoing description is in all aspects illustrative and not restrictive. It is therefore understood that numerous modifications and variations can be devised without departing from the scope of the present invention.

DESCRIPTION OF REFERENCE NUMERALS

1400, 1500, 1600 communication system, 1401, 1501, 1601 mobile terminal (UE), 1402, 1502, 1602 small cell cluster, 1403, 1503, 1603 MME, 1404, 1504, 1604 S-GW, 1405, 1505, 1605 small cell, 1406, 1506 macro cell, 1407, 1507, 1607 concentrator.

The invention claimed is:

1. A communication system comprising:
a communication terminal device;
one or more base station devices configured to communicate with said communication terminal device;
a plurality of cells that are configured by said one or more base station devices and are configured to communicate with said communication terminal device;
a network device that is provided on a core network side with respect to said one or more base station devices; and
a concentrator configured to select a cell to which said communication terminal device is to be connected from among said plurality of cells based on a data flow information including: (1) a first data size of received data that each one of said plurality of cells has received from said communication terminal device; (2) a second data size of transmission data that each one of said plurality of cells has transmitted to said network device, wherein the first data size of the received data is different from the second data size of the transmission data; and (3) buffer status report (BSR) information that indicates a status of a buffer of the communication terminal device that temporarily stores data transmitted from the communication terminal device to each one of the plurality of cells,
wherein said communication terminal device is configured to transmit said BSR information to only a first cell of said plurality of cells, wherein said transmitted BSR information includes short BSR and long BSR, wherein the short BSR includes information on a data amount of the transmission data of a dedicated control channel (DCCH), and the long BSR includes information on a data amount of the transmission data of a dedicated traffic channel (DTCH),
wherein said first cell is configured to transmit to the concentrator the long BSR and not the short BSR, and wherein said communication terminal device is configured to execute a connection to the cell selected by the concentrator.

2. The communication system according to claim 1, wherein the data flow information includes, as the first data size of said received data, said BSR information, and,
wherein said concentrator selects said cell to which said communication terminal device is to be connected from among said plurality of cells based on the data flow information including said BSR information and the second data size of said transmission data.

3. The communication system according to claim 1, wherein said plurality of cells comprise:
a macro cell having a first coverage range within which the cells can communicate with said communication terminal device; and
a plurality of small cells having a second coverage range that is less than the first coverage range,
wherein said concentrator selects a small cell to which said communication terminal device is to be connected from among said plurality of small cells.

4. The communication system according to claim 3, wherein said macro cell has a function of said concentrator.

5. The communication system according to claim 1, wherein said network device has a function of said concentrator.

6. The communication system according to claim 1, wherein the plurality of cells include:
a macro cell having a first coverage range within which the plurality of cells are configured to communicate with the communication terminal device, and
a plurality of small cells having a second coverage range that is included in the first coverage range,
wherein the concentrator is connected to the macro cell and the plurality of small cells and is configured to:
select a first small cell, from the plurality of small cells, to which the communication terminal device is to be connected based on the data flow of at least one of the received data and the transmission data, and
notify a second small cell to which the communication terminal device is currently connected of cell information of the first small cell as the small cell to which the communication terminal device is to be connected,
wherein the plurality of small cells are configured to notify the communication terminal device of the cell information of the first small cell, and
wherein the communication terminal device is configured to execute a connection to the first small cell that the concentrator has selected by using the cell information of the first small cell.

* * * * *